(12) United States Patent  
Kato

(10) Patent No.: US 7,150,075 B2
(45) Date of Patent: Dec. 19, 2006

(54) HINGE FOR PORTABLE TERMINAL

(75) Inventor: Hideo Kato, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 79 days.

(21) Appl. No.: 10/965,417

(22) Filed: Oct. 14, 2004

(65) Prior Publication Data
US 2005/0102798 A1 May 19, 2005

(30) Foreign Application Priority Data
Oct. 22, 2003 (JP) ............................. 2003-361670

(51) Int. Cl.
E05D 3/10 (2006.01)
(52) U.S. Cl. .......................... 16/367; 16/330
(58) Field of Classification Search .................. 16/367, 16/303, 330, 334, 371, 386; 455/575.1, 575.3; 379/433.13, 434; 361/683, 803
See application file for complete search history.

(56) References Cited

U.S. PATENT DOCUMENTS

| 6,256,837 | B1* | 7/2001 | Lan et al. ................. 16/334 |
| 2003/0040288 | A1* | 2/2003 | Kang et al. ............... 455/90 |
| 2004/0052058 | A1* | 3/2004 | Minami et al. ............ 361/724 |
| 2004/0200038 | A1* | 10/2004 | Kim ........................... 16/367 |
| 2005/0050687 | A1* | 3/2005 | Shiba ......................... 16/367 |
| 2005/0160558 | A1* | 7/2005 | Kim ........................... 16/367 |
| 2005/0198779 | A1* | 9/2005 | Jung et al. .................. 16/367 |
| 2006/0059661 | A1* | 3/2006 | Higano et al. .............. 16/366 |

FOREIGN PATENT DOCUMENTS

| EP | 1353488 A2 * | 10/2003 |
| JP | 2001227229 A * | 8/2001 |
| JP | 2003-133764 | 5/2003 |
| JP | 2003158306 * | 6/2003 |
| JP | 2003239943 A * | 8/2003 |
| JP | 2005023958 A * | 1/2005 |
| WO | WO 2004109131 A1 * | 12/2004 |

* cited by examiner

Primary Examiner—Chuck Y. Mah
(74) Attorney, Agent, or Firm—Notaro & Michalos P.C.

(57) ABSTRACT

A hinge for portable terminal comprising a first member having a keyboard portion and a second member having a display portion coupled to each other in a manner capable of opening/closing in a vertical direction and rotating in a horizontal direction at a predetermined open angle in the vertical direction. The second member is configured to rotate around a first hinge shaft accompanying an opening/closing operation of the second member relative to the first member in the vertical direction. A second hinge shaft is configured to couple the first and second members to one another in a manner capable of rotating the members in the horizontal direction. The second member is mounted to the second hinge shaft, and the first and second hinge shafts are crossed and engaged with each other at escape recessed portions mounted on each of the hinge shafts.

4 Claims, 29 Drawing Sheets

HINGE FOR PORTABLE TERMINAL

FIELD AND BACKGROUND OF THE INVENTION

The present invention relates to a hinge for portable terminal suitable for use in portable terminals such as a cellular phone, a small-sized office automation device, and the like.

DESCRIPTION OF THE RELATED ART

Regarding cellular phones among other portable terminals, for the reasons of portability, protection of a keyboard surface, prevention of malfunctions, and the like, two-fold types in which a transmitter section that is a first member and a receiver section that is a second member are coupled together to each other via a hinge are becoming the mainstream. Also, in recent years, various functions (camera function for example) are added to cellular phones, so that, along with such addition, functions expected from an opening/closing hinge are complicated as well.

In such a situation, a hinge constructed such that a transmitter section and a receiver section can be opened/closed using two shafts and further the receiver section can rotate about the shaft in a horizontal direction in a state that the receiver section is opened with respect to the transmitter section is publicly known from an invention disclosed in Japanese Patent Application Laid-open No. 2003-133764.

Although the hinge described in the laid-open patent application uses two shafts, these shafts are not crossed to interfere with each other. Thus, there has been a problem that a force to pull the receiver section away from the transmitter section in an up and down direction is generated at the time of opening/closing, which causes positional displacement in a left and right direction to cause a malfunction. Further, the conventionally known one has problems such that it is difficult to produce strength in the hinge, and that the sense of operation is monotonous since opening/closing operations in the opening direction and the closing direction are the same.

SUMMARY OF THE INVENTION

An object of the present invention is to provide a hinge for portable terminal capable of preventing occurrence of positional displacement of respective component members to preclude malfunctions and moreover performing a different operation at the time of performing an opening operation and a closing operation.

Incidentally, although a case of embodying the present invention in a cellular phone will be described below, it is needless to mention that the present invention can be embodied in other portable terminals of two-fold type such as a small-sized office automation device.

In order to achieve the above described object, the present invention provides a hinge for portable terminal coupling a first member having a keyboard portion and second member having a display portion of a portable terminal of two-fold type to each other in a manner capable of opening/closing in a vertical direction and capable of rotating in a horizontal direction at a predetermined open angle, and the hinge is characterized by including a cylindrical case cover having a partition wall in a center portion thereof; a first hinge shaft which passes through the partition wall of the case cover and extends in an axial core direction of the case cover so as to be restricted from moving in an axial direction and so as to allow the case cover to rotate around an axis thereof, and which has a first escape recessed portion provided in a portion thereof passing through the partition wall; a case in which the first hinge shaft passes through in an axial core portion thereof in the axial direction and which is fixed to a free end side of the first hinge shaft; a vertical rotation control means, which is provided between the case and the case cover and constituted of a first cam mechanism, for controlling vertical rotation of the case cover; a second hinge shaft having a second escape recessed portion and rotatably attached to the partition wall, with the second escape portion being in contact with and crossing the first escape recessed portion of the first hinge shaft; a mounting member which has a mounting cylindrical portion and a mounting piece attached to the second member and is provided on a free end side of the second hinge shaft to be rotatable at a predetermined horizontal rotation angle, the second hinge shaft passing through the mounting cylindrical portion in an axial direction, said mounting member being restricted from disengaging so as to rotate together with the second hinge pin, and one end side of the mounting member abutting on the case cover; and, a horizontal rotation control means, which is provided between the mounting member and said case cover and constituted of a second cam mechanism, for controlling horizontal rotation of the case cover, further the hinge is characterized by that one end of said case cover is rotatably supported by one of attaching portions provided on both sides of an end portion of the first member, said case is inserted and fitted in a mounting portion provided in the other attaching portion of the first member, said mounting member is fixed to the second member, and the first hinge shaft and the second hinge shaft have the escape recessed portions in a portion where the said first hinge shaft and said second hinge shaft are in contact with each other and cross each other, so that from a closing state to a predetermined open angle of the first member and the second member, the first hinge shaft engages with the escape recessed portion of the second hinge shaft to restrain the rotation of the second hinge shaft, and at the predetermine open angle, the escape recessed portion of the second hinge shaft is at a position facing the escape recessed portion of the first hinge shaft to allow the second hinge shaft to rotate.

Further, the present invention provides a hinge for portable terminal coupling a first member having a keyboard portion and second member having a display portion of a portable terminal of two-fold type to each other in a manner capable of opening/closing in a vertical direction and capable of rotating in a horizontal direction at a predetermined open angle, and the hinge is characterized by including: an inner cam having a cam portion on an end portion thereof and arranged in the case cover with the first hinge shaft being inserted through a center portion thereof in the axial direction in a slidable and rotatable manner; a flange portion provided in the first hinge shaft to limit the axial direction sliding of the inner cam up to a predetermined position; an outer cam accommodating the inner cam inside in a manner rotatable at a predetermined rotation angle and slidable in the axial direction, the outer cam being accommodated in the case cover in a state being restrained from rotating and having a cam portion on an end portion thereof in the same direction as the cam portion of said inner cam; a guide plate provided on the partition wall side of said case cover to be engaged with said outer cam, with said first hinge shaft being inserted in an axial core portion thereof in the axial direction; a spring resiliently provided between said inner cam and said guide plate in a state being wound on the first hinge shaft to bias the inner cam to rotate in one direction and to slide in one direction; a cam follower in which the first hinge shaft is inserted through an axial core portion thereof in the axial direction and a cam portion is provided on a side corresponding to the inner cam accommodated in said cover in a slidable manner in one direction; and a compression spring which biases said cam follower to slide in a direction of the inner cam and the outer cam.

Further, in the hinge according to the present invention, may include a horizontal rotation control means including: a first cam for swiveling of a base cam, in which said second hinge shaft is inserted through a center portion thereof in the axial direction in a rotatable manner, provided on said case cover side; a second cam for swiveling of a rotary cam, in which said second hinge shaft is inserted through a center portion thereof in the axial direction in a slidable manner, attached on the second member; and a compression spring wound on said second hinge shaft to push the second cam for swiveling toward said first cam for swiveling.

Further, in the hinge according to the present invention, the case cover may have a conducting wire guiding portion formed therein in which a conducting wire connecting the first member and the second member is passed through.

Since the second hinge shaft to which the second member is attached is crossed and engaged with the first hinge shaft and is constructed to be capable of rotating only at a predetermined rotation angle of the first hinge shaft, it is possible to prevent displacement of the second hinge shaft and the first hinge shaft in the axial direction even when the first member and the second member are repeatedly opened and closed, so that the positional displacement does not occur and malfunctions can be prevented. Moreover, when the first member and the second member are opened/closed, the cam portion of the cam follower is in pressure contact with the respective cam portions of the inner cam and the outer cam which are overlapping with each other, so that an advantage can be achieved that the opening operation and the closing operation can be varied to provide opening/closing operations with different senses of operations respectively.

DETAILED DESCRIPTION OF THE PREFERRED EMBODIMENTS

Hereinafter, an embodiment of the present invention will be described based on the drawings.

Figure 1:
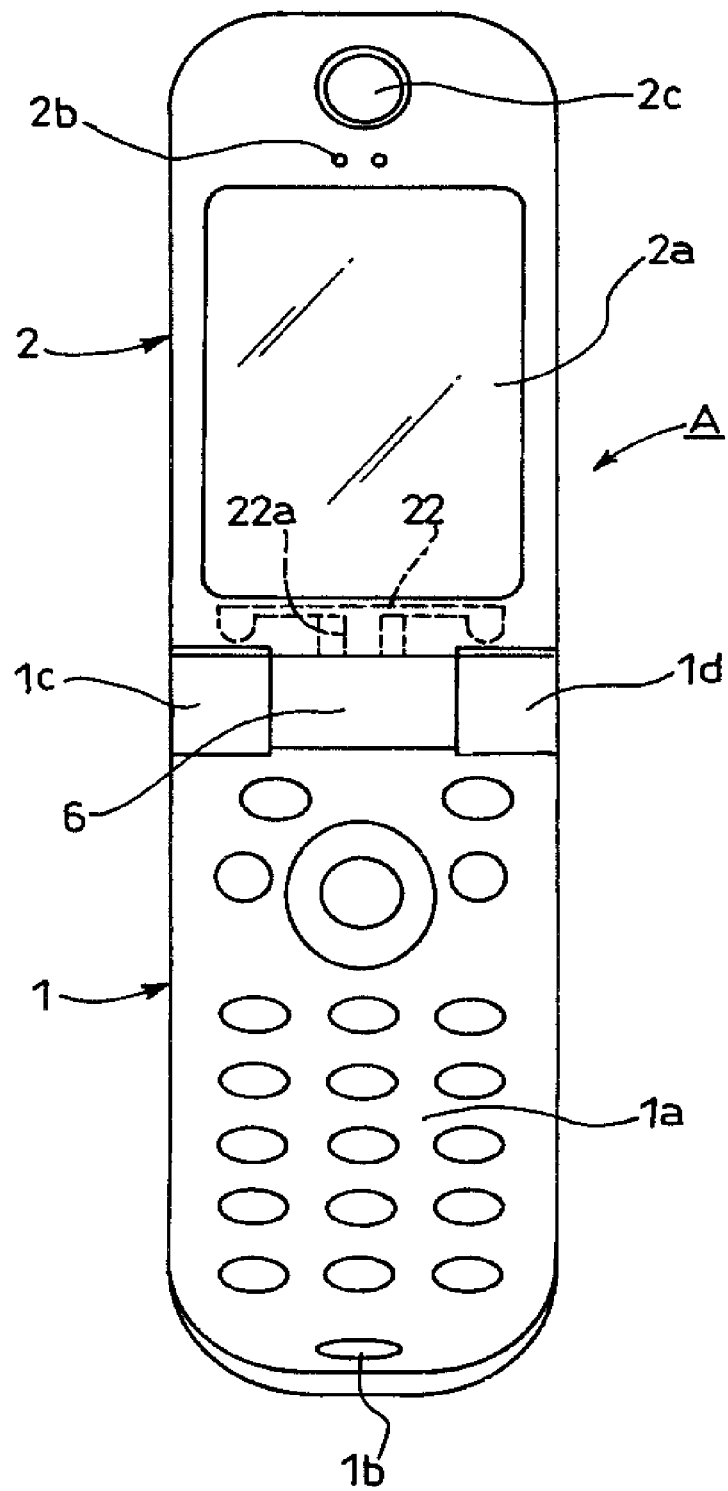
FIG. 1 is a perspective view showing a cellular phone of two-fold type that is open in which a hinge for portable terminal according to the present invention is embodied.
Figure 2:
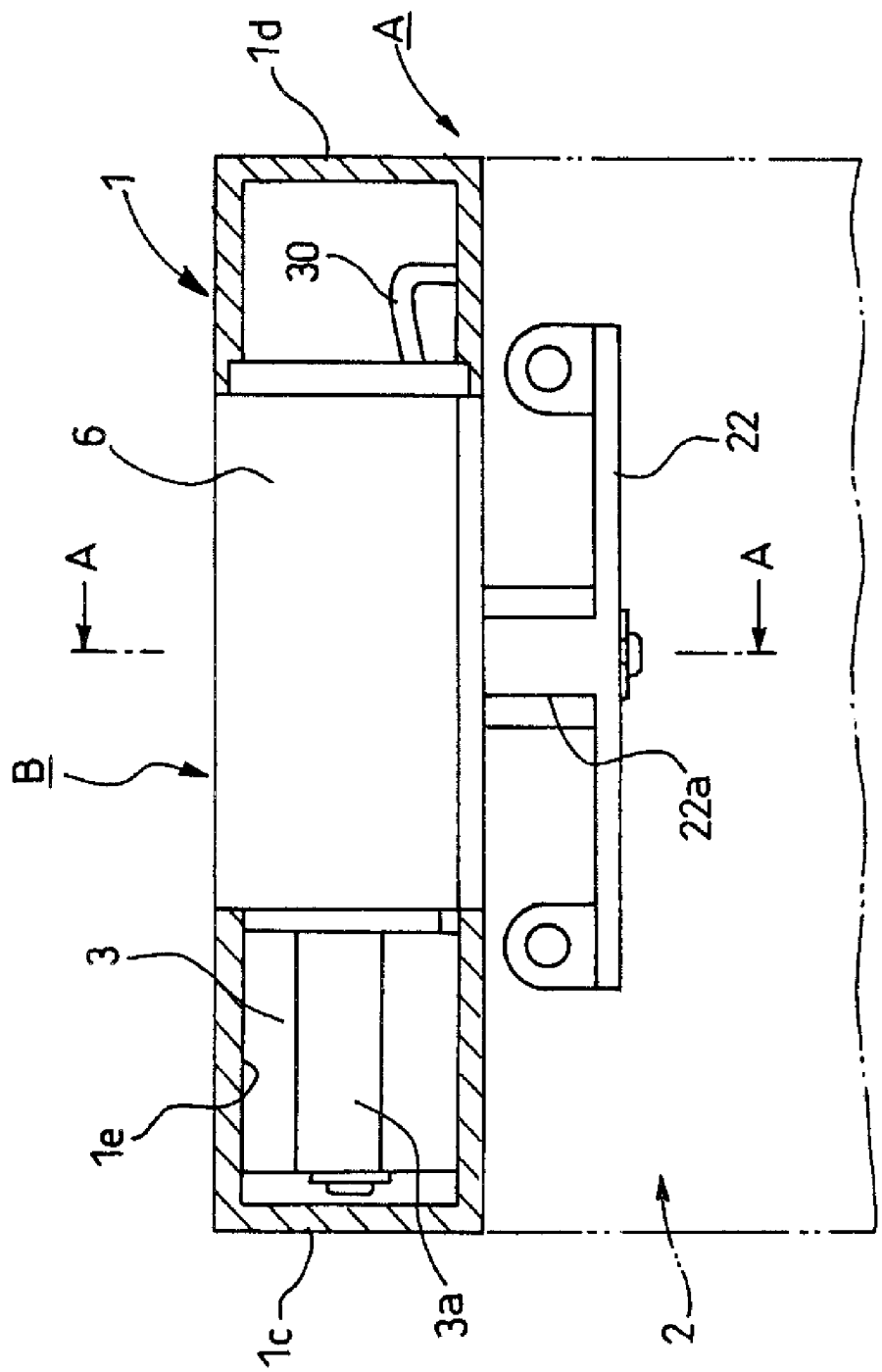
FIG. 2 is an explanatory view showing an attaching state of the hinge for portable terminal according to the present invention from a planar angle.
Figure 3:
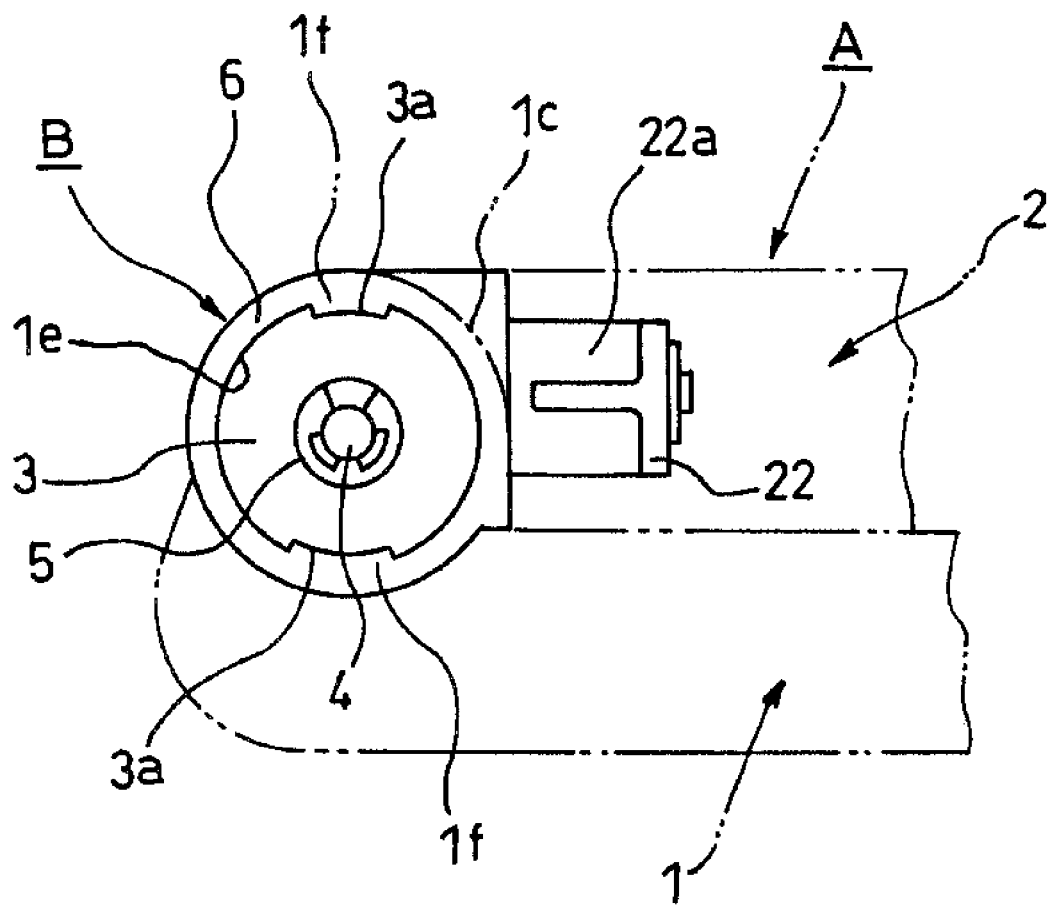
FIG. 3 is a left side view of the hinge for portable terminal according to the present invention.
Figure 4:
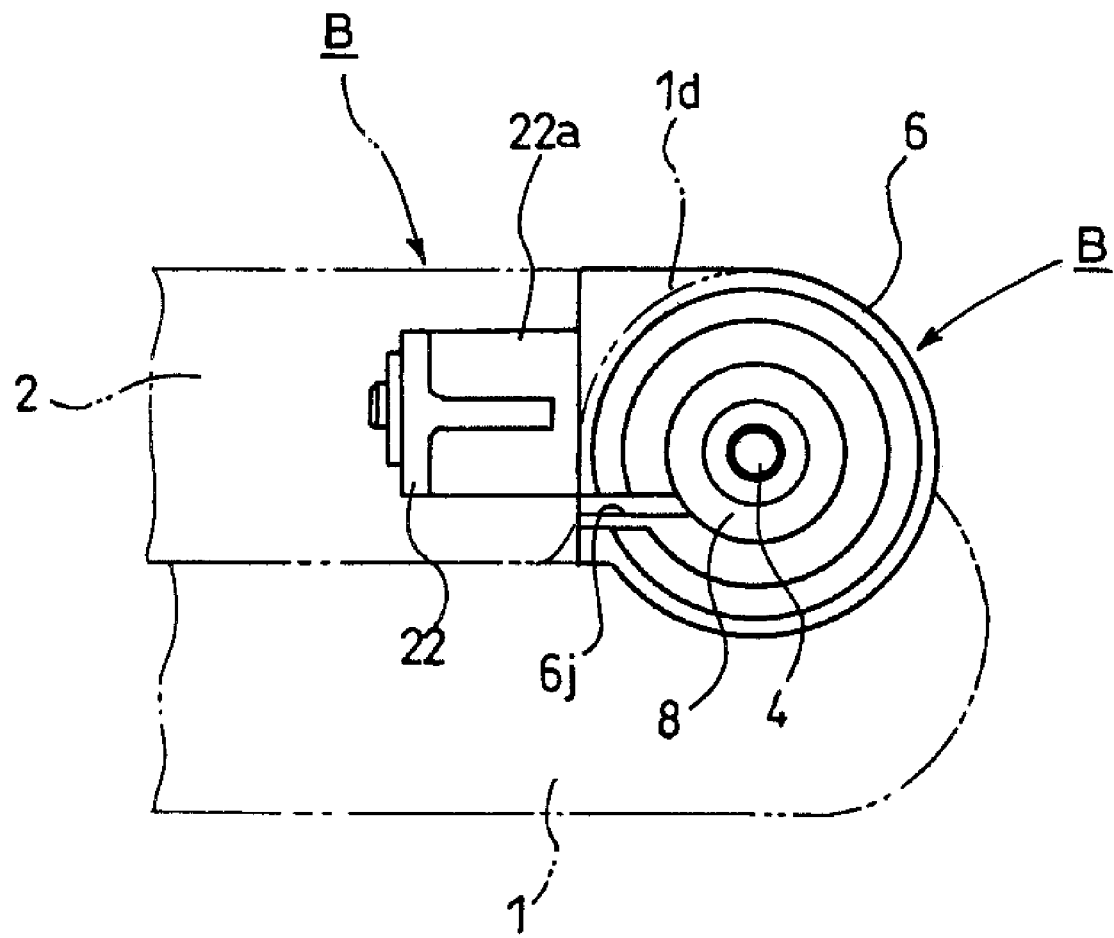
FIG. 4 is a right side view of the hinge for portable terminal according to the present invention.

In FIG. 1, the reference numeral 1 denotes a transmitter section constituting a first member of a cellular phone A of two-fold type, and on its top surface side, a keyboard 1a and a microphone 1b are provided. The reference numeral 2 denotes a receiver section constituting a second member, and on a side thereof facing the keyboard side when it is closed, a display portion 2a, a speaker 2b, and a camera 2c are provided.

A hinge B according to the present invention is, as shown particularly in FIG. 1, attached between attaching portions 1c, 1d for coupling the transmitter section 1, and the structure thereof is shown in FIG. 2 to FIG. 20.

Figure 5:
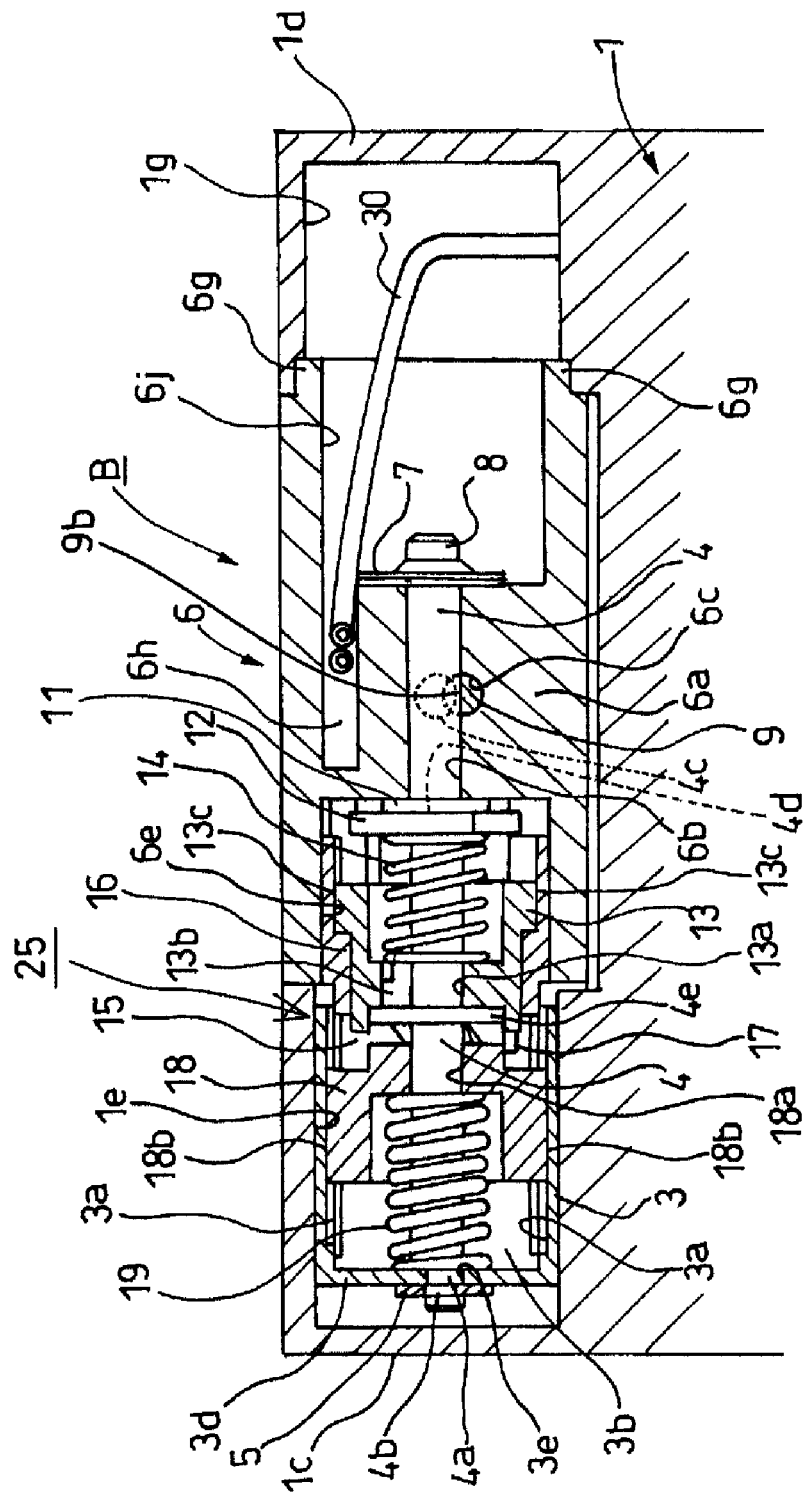
FIG. 5 is a front cross-sectional view showing the inner structure of the hinge for portable terminal according to the present invention.

FIG. 5 shows a cylindrical case whose one end is open. As shown particularly in FIG. 8 and FIG. 15, this case 3 has recessed locking grooves 3a, 3a formed on its outer periphery in the axial direction, and is inserted into an insertion hole 1e formed on the attaching portion 1c of the transmitter section 1 in the axial direction and fixed to the attaching portion 1c by engaging projecting locking portions 1f, 1f formed inside this insertion hole 1e with the recessed locking grooves 3a, 3a, as shown particularly in FIG. 2 and FIG. 3.

Figure 15:
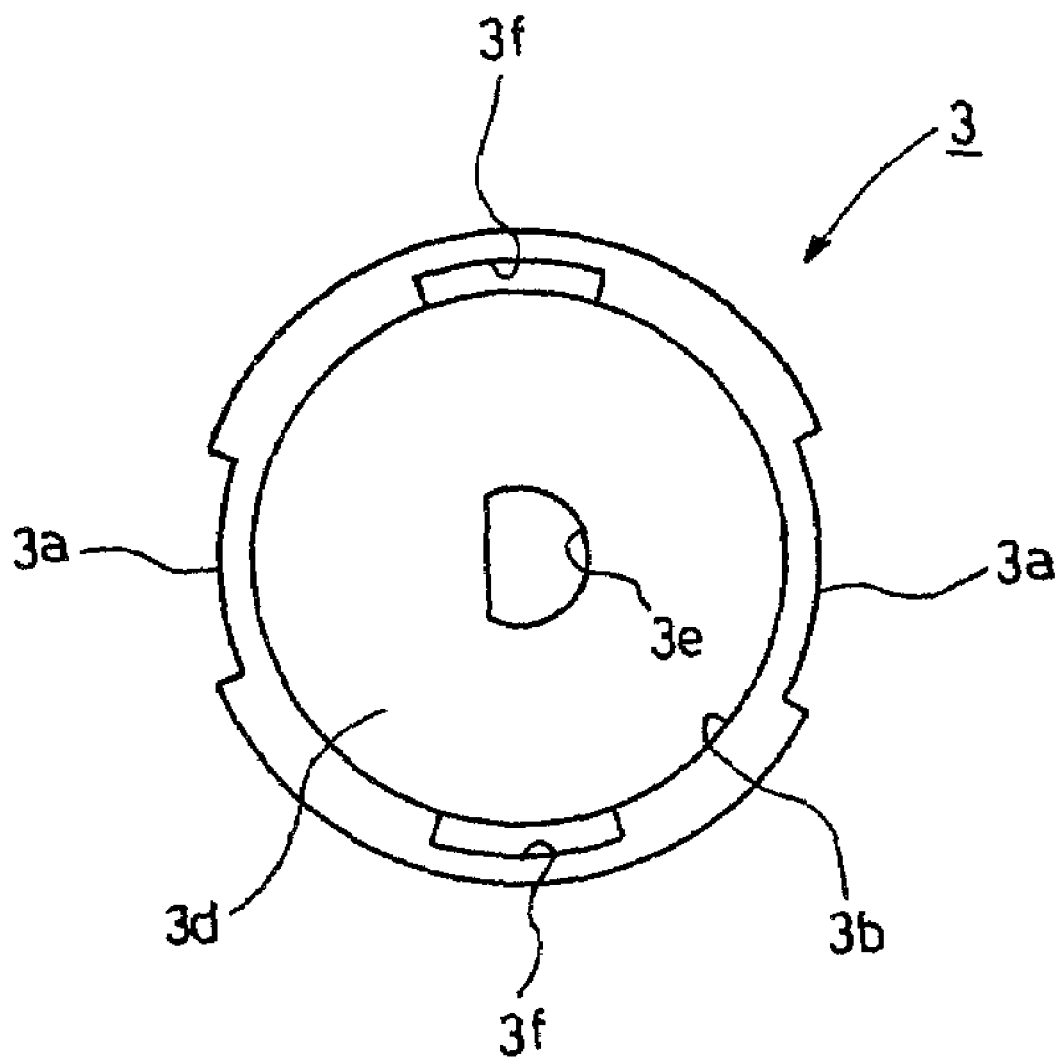
FIG. 15 is a right side view of a cover.
Figure 16:
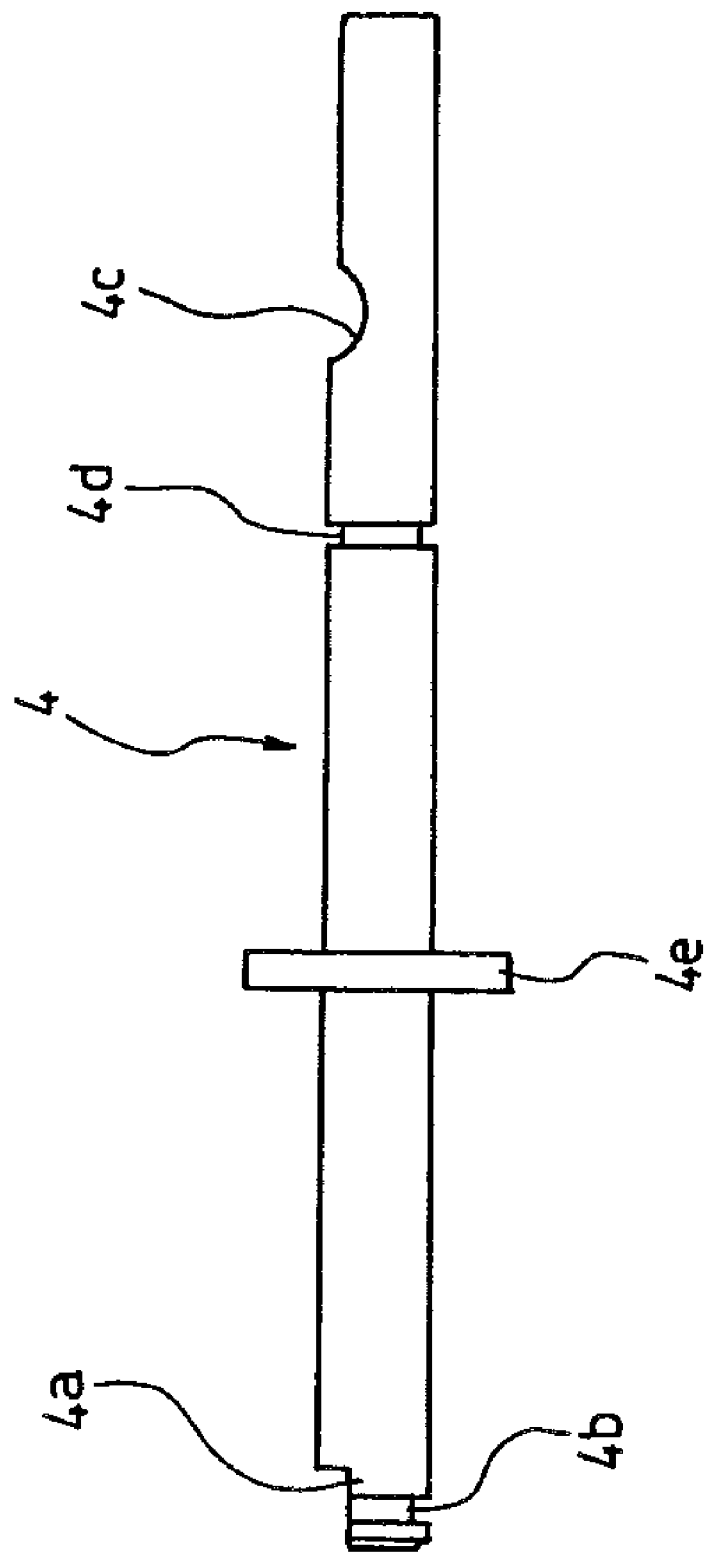
FIG. 16 is a plan view of a first hinge shaft.
Figure 17:
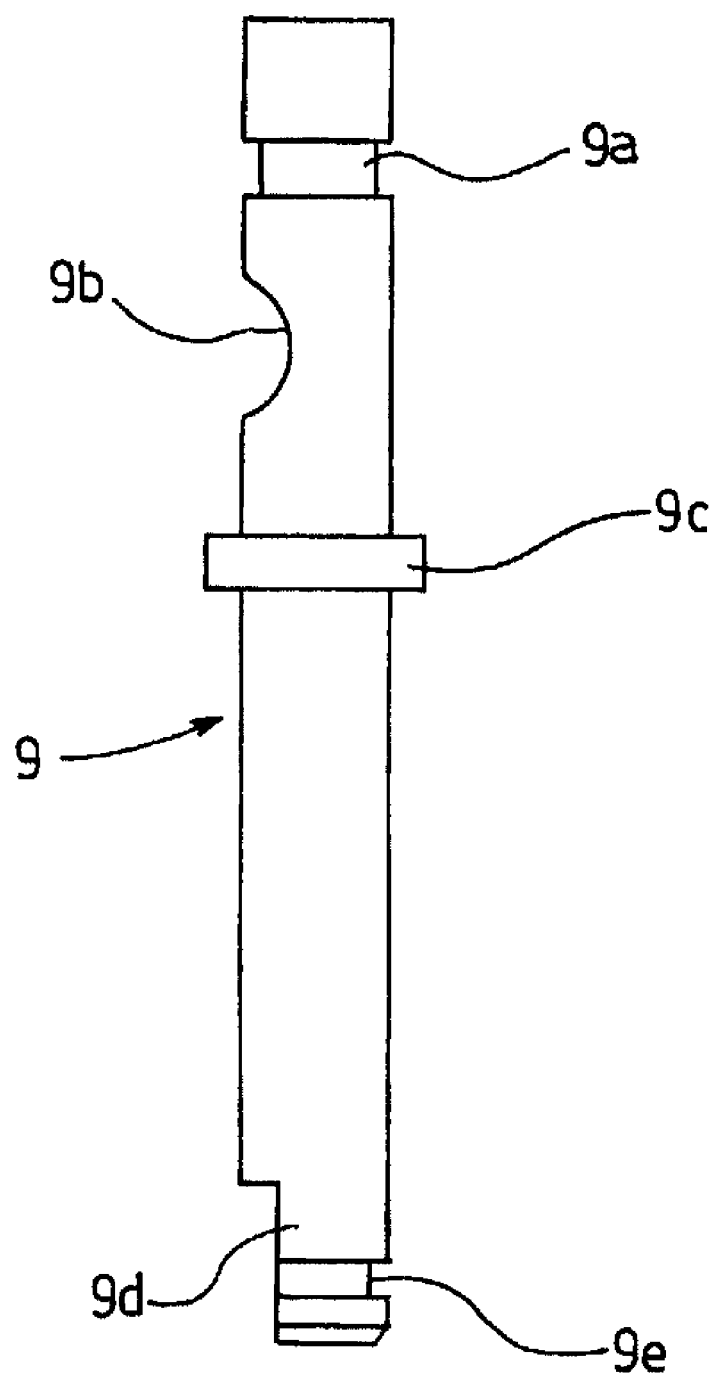
FIG. 17 is a side view of a second hinge shaft.

This case 3 further has, as shown particularly in FIG. 5 and FIG. 15, a side wall 3d on its one end portion, and in the inside of the case 3, an attaching portion 4a which has a D shape on its cross-section and is formed on an end portion of the first hinge shaft 4 as shown in FIG. 16, is inserted into and engaged with a locking hole 3e having a D shape formed in the center portion of the side wall 3d in the axial direction.

The first hinge shaft 4 has, as shown in FIG. 5 and FIG. 16, a first circumferential groove 4b on the side of the case 3 in which the locking hole 3e is formed, and an E ring 5 is fitted into this first circumferential groove 4b as shown in FIG. 5, so that the case 3 is locked to be prevented from disengaging. The first hinge shaft 4 further penetrates the center portion of the case 3 in the axial direction, and its one end portion side penetrates a bearing hole 6b formed in a partition wall 6a of a case cover 6 in the axial direction, which is inserted into and pivotally supported inside a cavity portion 1g formed in the attaching portion 1d. The first hinge shaft 4 thus engages the case cover 6, and is pivotally supports the case cover 6 via a washer 7 and a push nut 8 to be rotatable.

Figure 6:
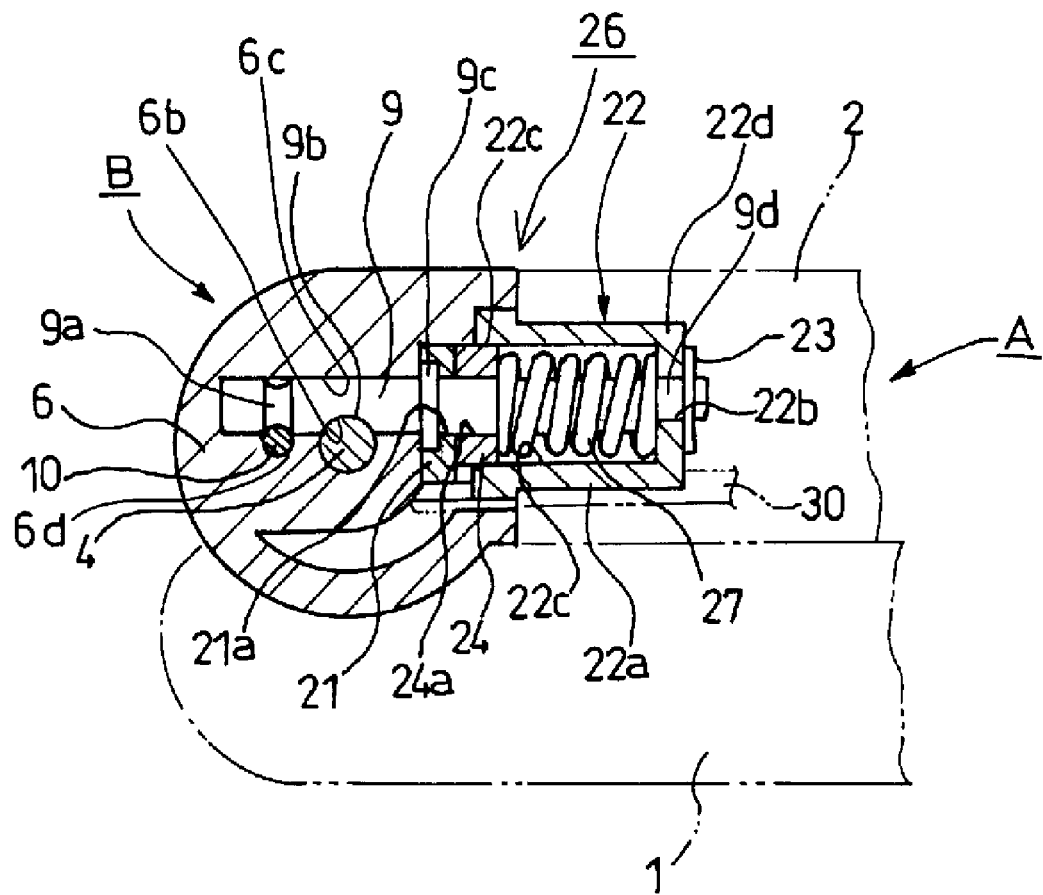
FIG. 6 is a cross-sectional view taken along the A—A line in FIG. 1.
Figure 7:
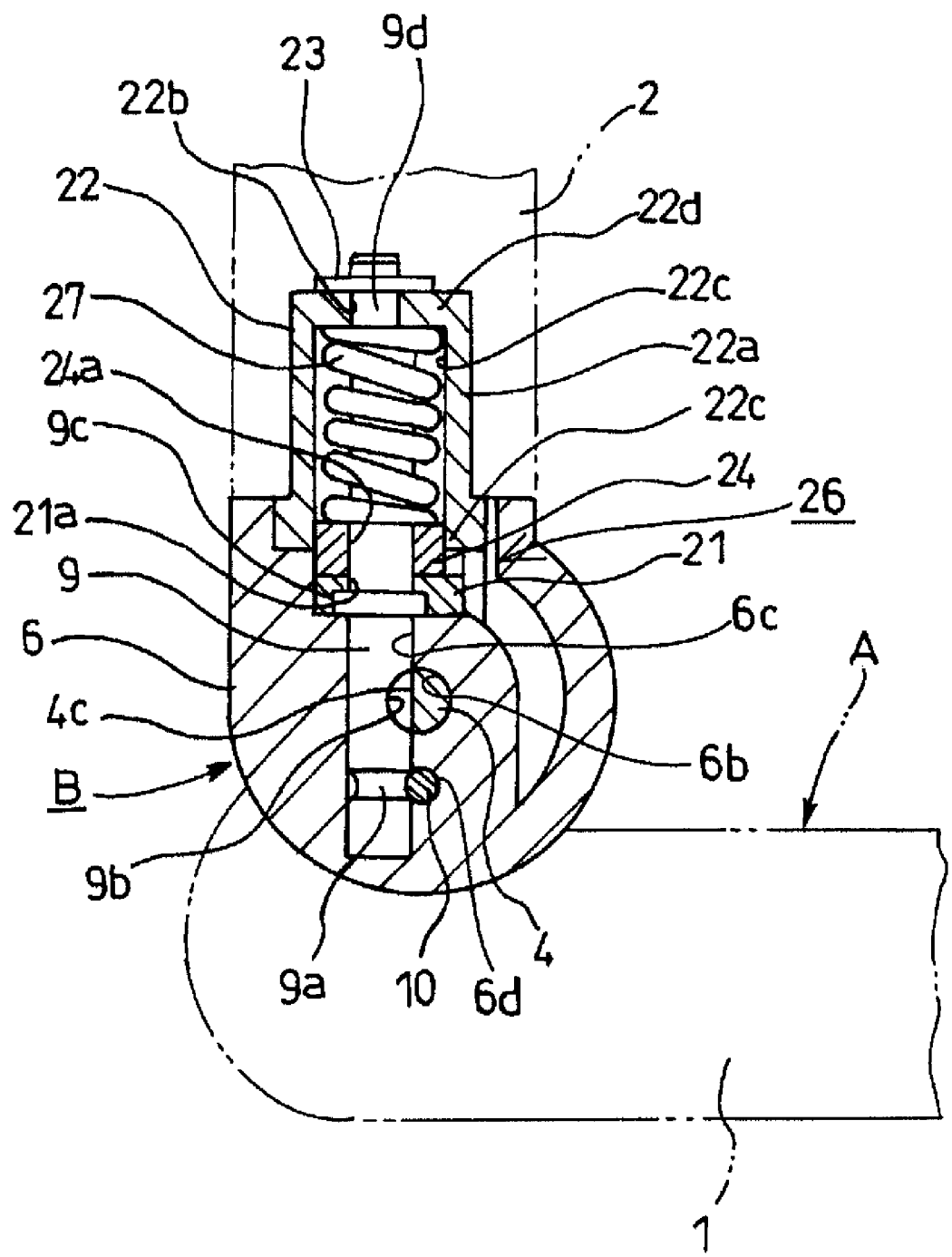
FIG. 7 is a cross-sectional view showing a receiver section opened at 90° with respect to a transmitter section from a state in FIG. 6.

On this case cover 6, as shown particularly in FIG. 6 and FIG. 7, a thrust bearing hole 6c is formed on a position slightly displaced in a direction orthogonal to the bearing hole 6b, and a pin hole 6d is formed in parallel and out of alignment with this thrust bearing hole 6c. Into the thrust bearing hole 6c, a second hinge shaft 9 is inserted, and a circumferential groove 9a formed on an inserting end side thereof is engaged with a pin 10 pressed into the pin hole 6d to thereby prevent disengagement. The second hinge shaft 9 and the first hinge shaft 4 interfere with each other by coming into contact and crossing with each other. A first escape recessed portion 4c and a second escape recessed portion 9b are provided on this crossing portion so that the second hinge shaft 9 is constructed to be able to rotate in a horizontal direction when the first hinge shaft 4 is rotated at a predetermined angle (90° in this embodiment) and the second escape recessed portion 9b of the second hinge shaft 9 is opposed to the first escape recessed portion 4c of the first hinge shaft 4.

Furthermore, on the left side of this case cover 6, a conducting wire guiding portion 6j is provided, and a conducting wire 30 led out from the first member 1 side is led via this conducting wire guiding portion 6j to the second member 2 side, as shown particularly in FIG. 5.

The first hinge shaft 4 is, as shown particularly in FIG. 5, restricted in the axial direction so as not to move in the axial direction by sandwiching the partition wall 6a of the case cover 6 between an E ring 11 attached to a second circumferential groove 4d formed on the outer periphery of the first hinge shaft 4 and the push nut 8, and a guide plate 12 is attached in contact with the E ring 11 with the first hinge shaft 4 being inserted through an insertion hole 12a formed in the center portion thereof in the axial direction.

Figure 11:
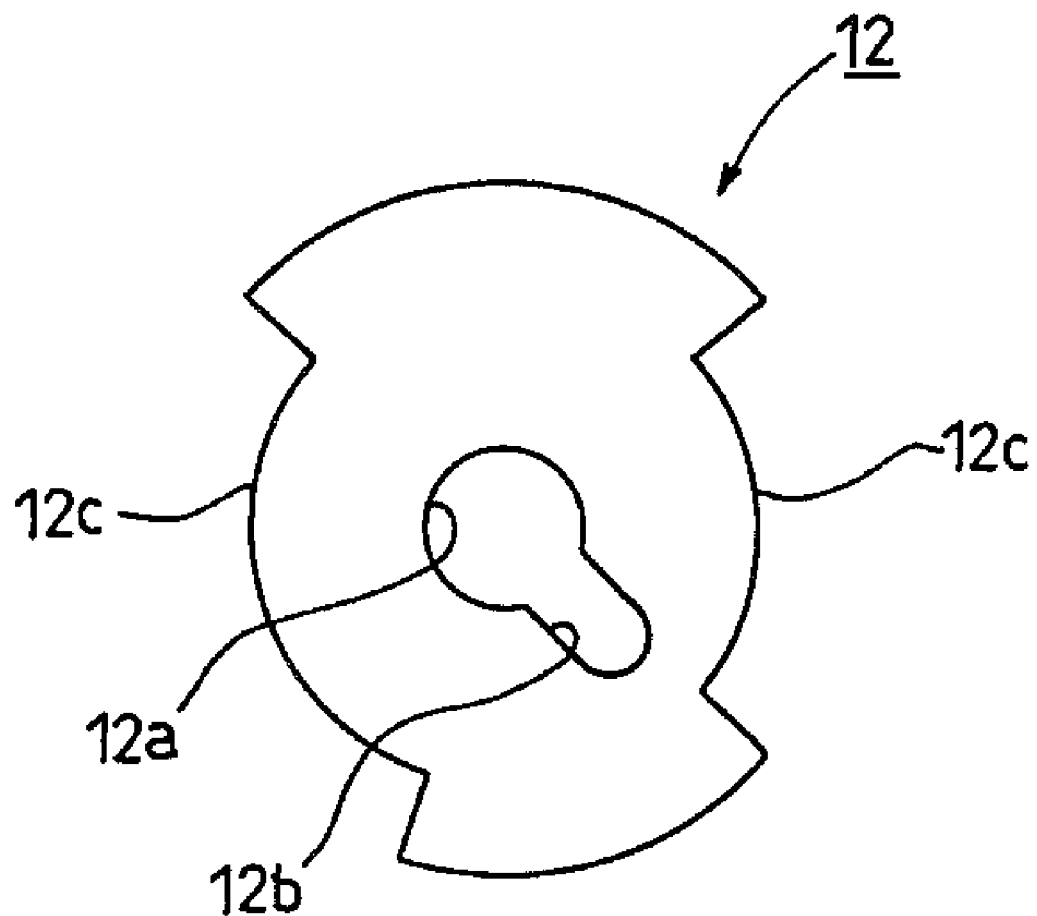
FIG. 11 is a right side view of a guide plate.
Figure 12:
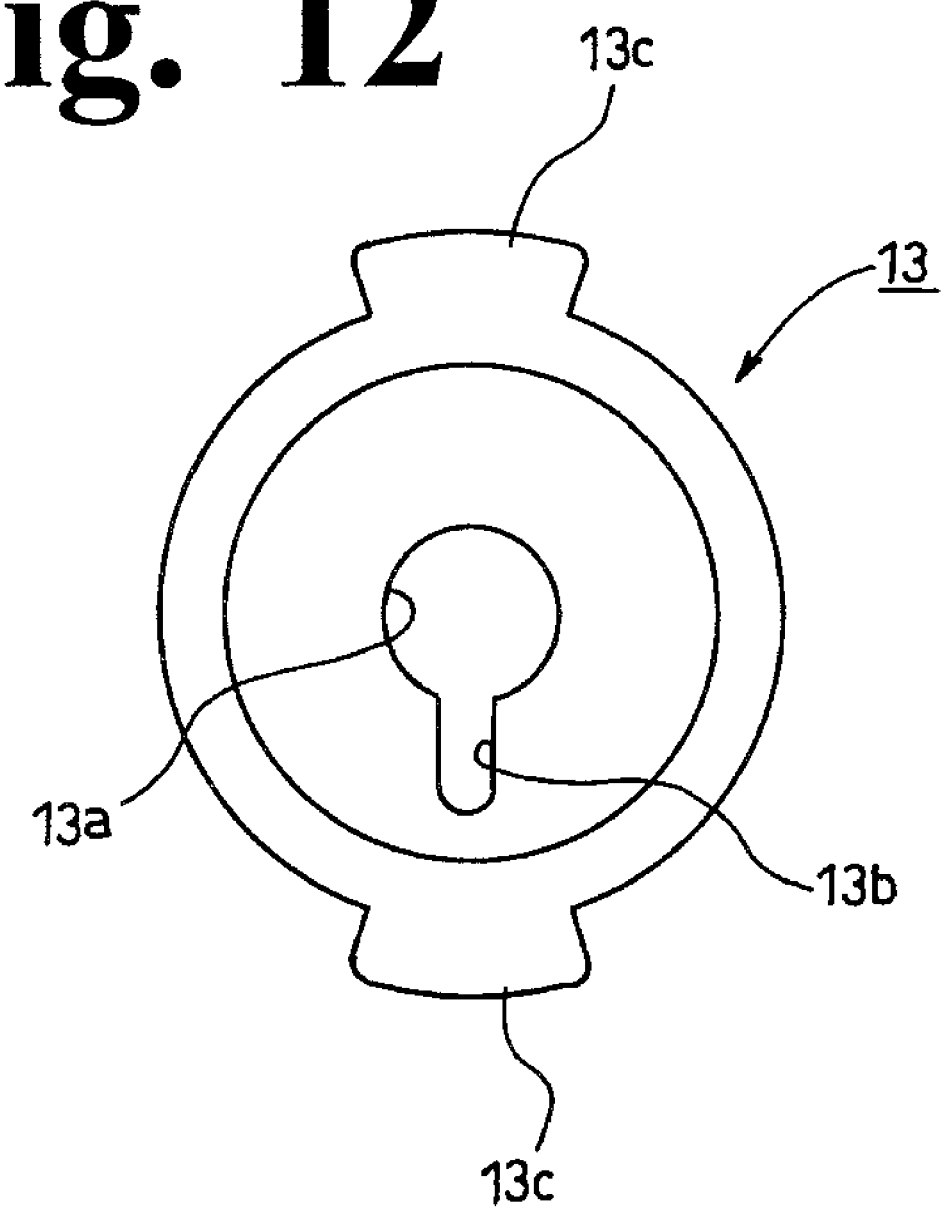
FIG. 12 is a right side view of an inner cam.

Between the E ring 11 and a flange portion 4e provided on a middle portion of the first hinge shaft 4, as shown similarly in FIG. 5, an inner cam 13 is attached to be slidable in the axial direction with the first hinge shaft 4 being inserted through an inserting hole 13a formed in the center portion thereof in the axial direction, and between the inner cam 13 and the guide plate 12, a coil spring 14 being wound on the first hinge shaft 4 and serving both as a compression spring and a torsion spring is resiliently disposed to slidably and rotatably bias the inner cam 13 in one direction by locking one end portion thereof, as shown particularly in FIG. 11, in a locking groove 12b formed in the insertion hole 12a of the guide plate 12, and locking the other end portion thereof, as shown particularly in FIG. 12, in a locking groove 13b formed in an insertion hole 13a of the inner cam 13, respectively.

Figure 8:
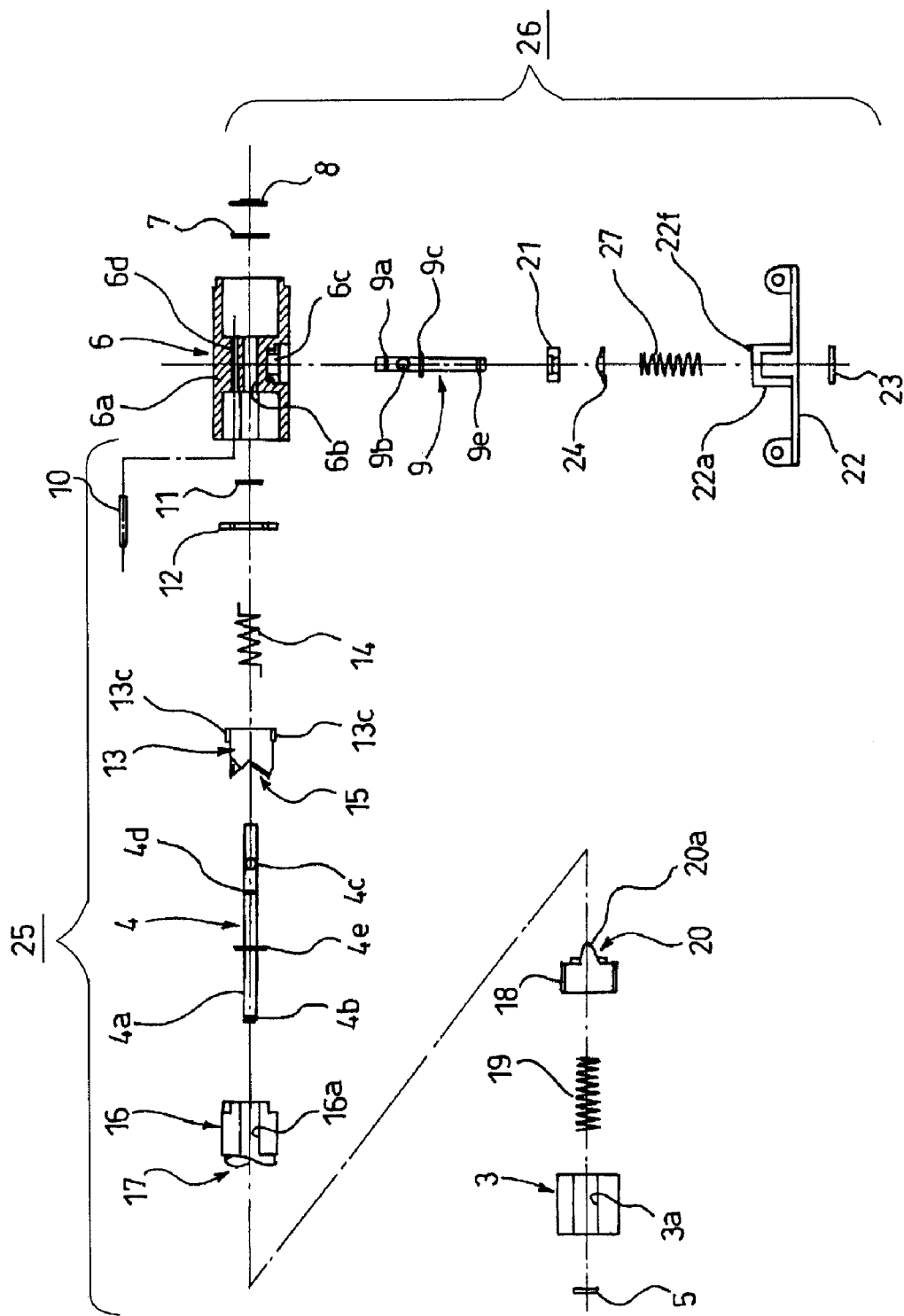
FIG. 8 is a partial cross-sectional exploded view of the hinge for portable terminal according to the present invention.
Figure 9:
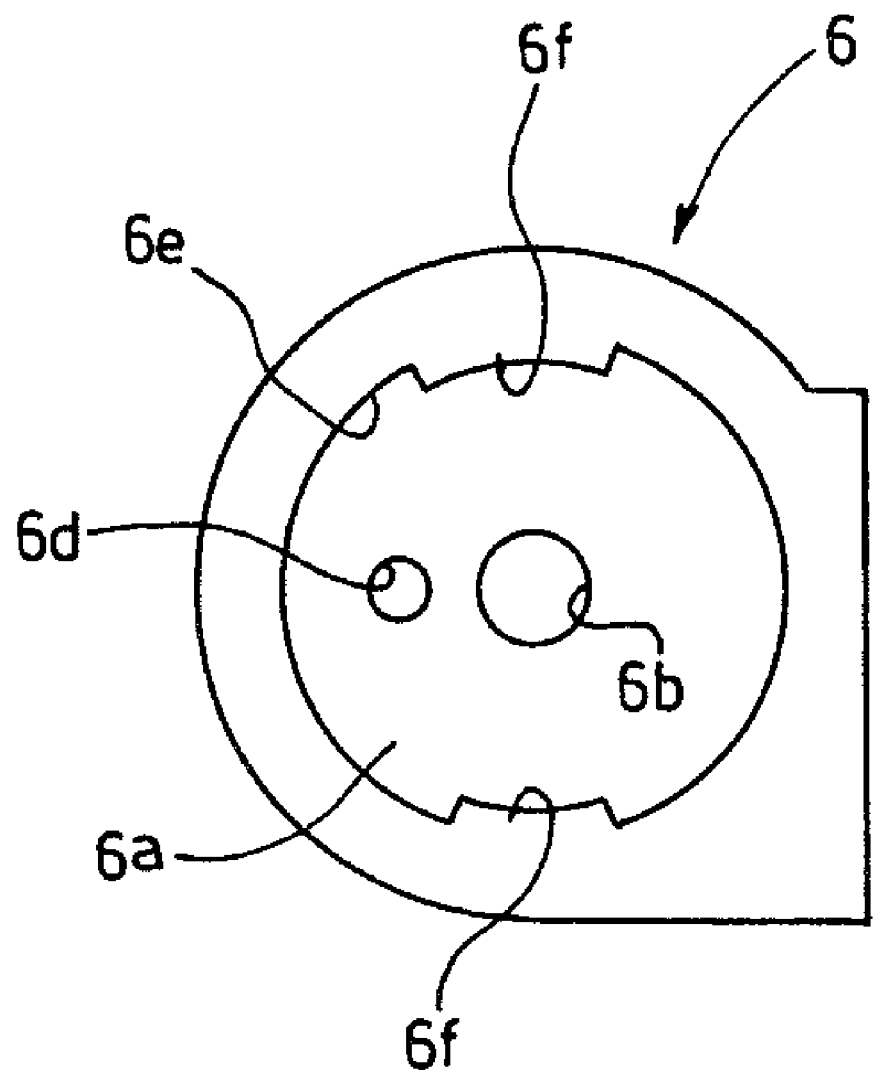
FIG. 9 is a left side view of a case cover.
Figure 13:
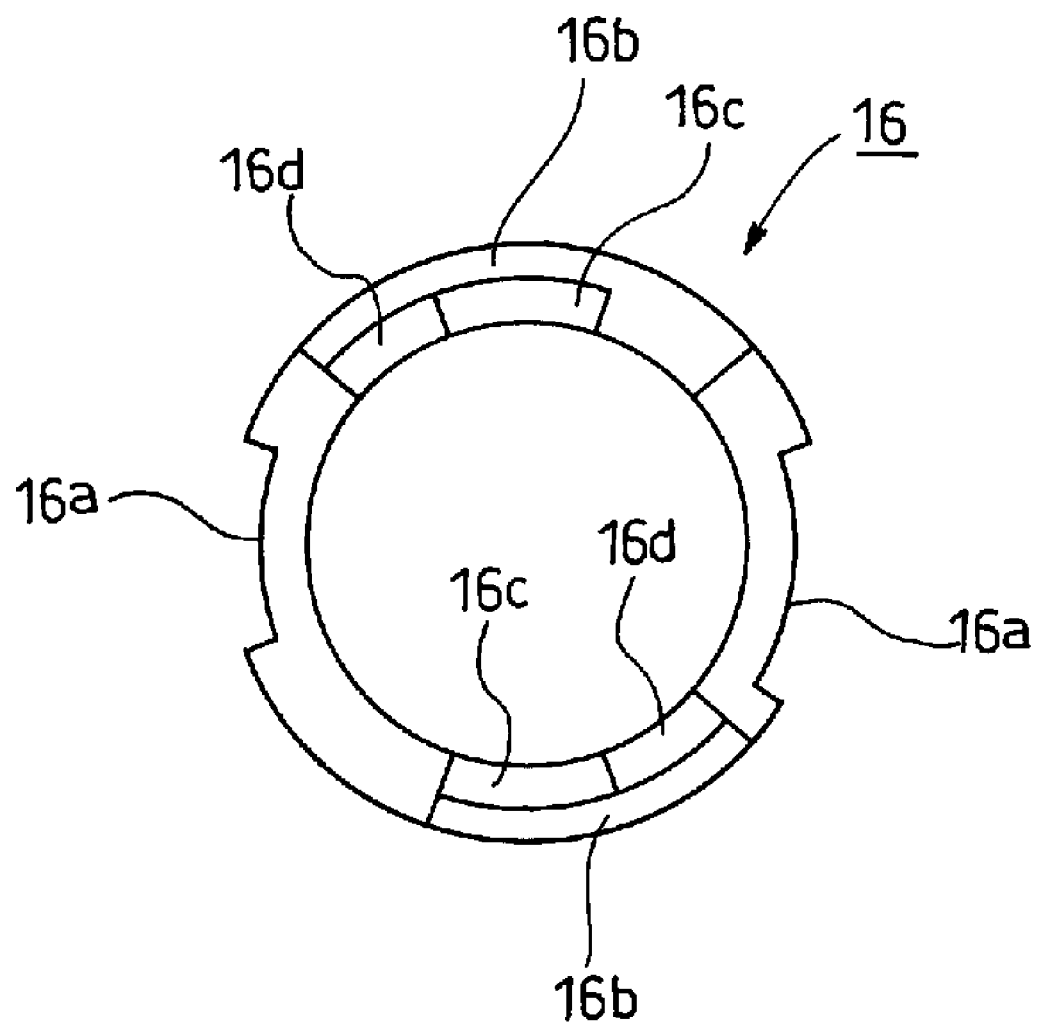
FIG. 13 is a right side view of an outer cam.

The inner cam 13 has, as shown particularly in FIG. 8 and FIG. 12, a pair of locking projections 13c, 13c formed on the outer periphery of one end portion side thereof and a first cam portion 15 is formed on an end surface of the other end portion thereof as shown in FIG. 5 and FIG. 8, and is accommodated inside an outer cam 16 in a cylindrical shape arranged around the outer periphery thereof. The locking projections 13c, 13c of the inner cam 13 rotate in a circumferential direction and slide in an axial direction, and both movements take place inside first key grooves 16c, 16c and second key grooves 16d, 16d of an outer cam 16; when engaged with first key grooves 16c, 16c, the locking projections 13c, 13c are retracted into the outer cam 16, and when engaged with second key grooves 16d, 16d, they protrude out of the outer cam 16 on the side of a first cam portion 15; a rotation thereof in a circumferential direction is restricted within the range equivalent to a sum of a width of either one of first key grooves 16c, 16c and that of either one of second key grooves 16d, 16d. The most part of this outer cam 16 is inserted into an accommodating portion 6e formed in the case cover 6, and as shown in FIG. 13, guide grooves 16a, 16a formed on the outer periphery thereof in the axial direction are engaged with projecting portions 6f, 6f as shown in FIG. 9 formed in the accommodating portion 6e to be fixed into the case cover 6. As shown in FIG. 8, a second cam portion 17 is provided on one end portion side of the outer cam 16. Thus, the first cam portion 15 and the second cam portion 17 are overlapping with each other in a radial direction as shown in FIG. 5 and FIG. 21 to FIG. 24. The guide plate 12 provides a unidirectional rotation torque to the inner cam 13 via the coil spring 14 by engaging recessed portions 12c, 12c formed on the outer periphery thereof as shown particularly in FIG. 11 being engaged with locking grooves 16b, 16b formed on the outer cam 16 as shown in FIG. 13.

Figure 14:
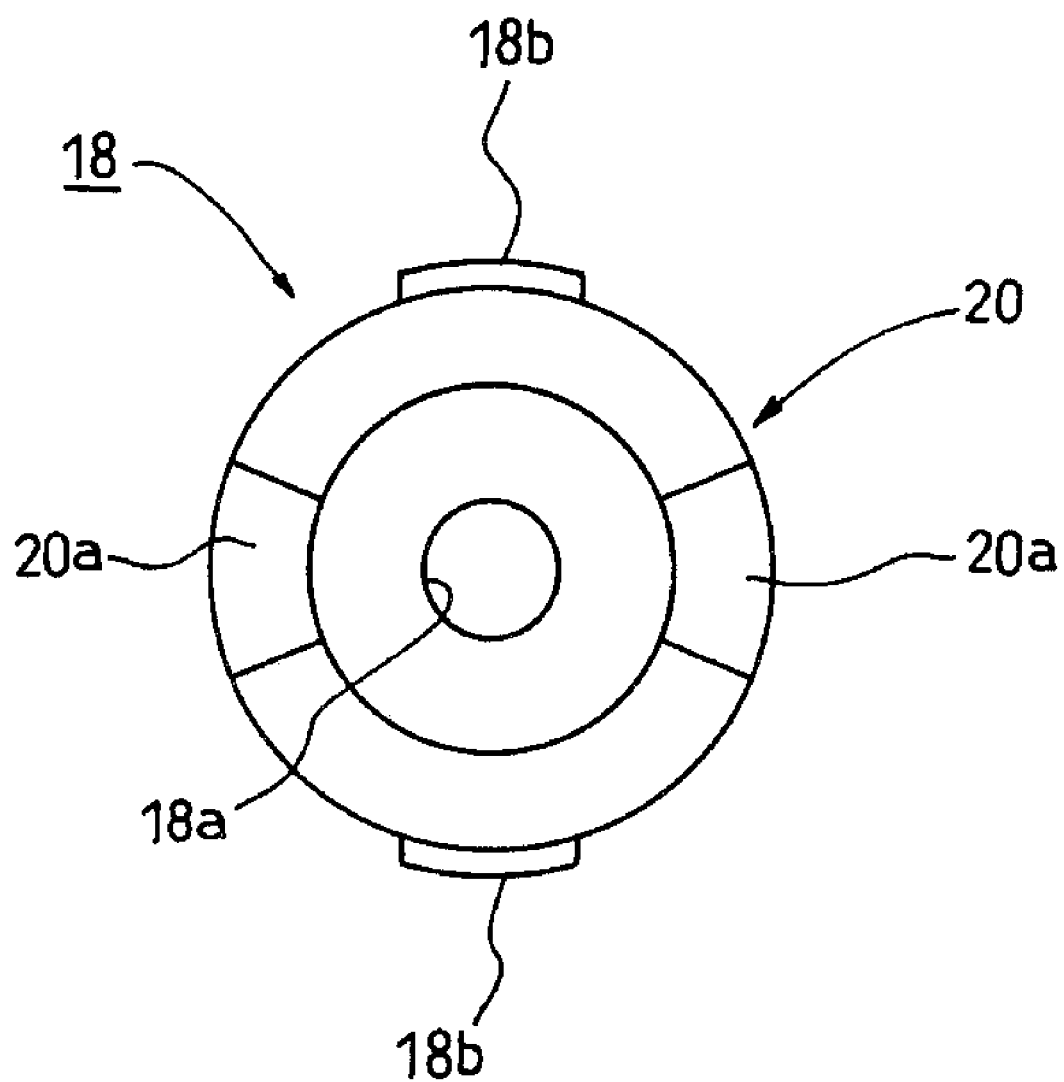
FIG. 14 is a right side view of a cam follower.

On the left side of the first hinge shaft 4, a cam follower 18 is attached, as shown in FIG. 5, so that a third cam portion 20 formed on an end surface thereof opposes the first and second cam portions 15, 17, with the first hinge shaft 4 being inserted through an insertion hole 18a formed in the center portion thereof in the axial direction. This cam follower 18 is constructed to be restrained from rotating by the case 3 and to be slidable in the axial direction as shown in FIG. 5 by engaging projecting portions 18b, 18b formed on the outer periphery thereof in the axial direction with recessed grooves 3f, 3f (refer to FIG. 9) formed on the inner wall of the case 3 as shown in FIG. 14. Between this cam follower 18 and the inside of the side wall 3d of the case 3, a compression spring 19 being wound on the first hinge shaft 4 is resiliently disposed as shown in FIG. 5 to bias the cam follower 18 constantly to slide in a direction toward the inner cam 13 and the outer cam 16.

Thus, the cam follower 18 is pushed toward the inner cam 13 and the outer cam 16 via the compression spring 19, and the inner cam 13 and the outer cam 16 are pushed in a direction toward the cam follower 18 via the coil spring 14, so that the first cam portion 15 of the inner cam 13 and the second cam portion 17 of the outer cam 16 are in pressure contact with the third cam portion 20 of the cam follower 18, and further the inner cam 13 is biased to rotate in one direction by the coil spring 14.

In a vertical rotation control means 25, which controls a vertical rotation of a first member 1 with regard to a second member 2, the following components are included: an inner cam 13 having a cam portion on an end portion thereof and arranged in said case cover 6 with the first hinge shaft 4 being inserted through a center portion thereof in the axial direction in a slidable and rotatable manner; a flange portion 4e provided in the first hinge shaft 4 to limit the axial direction sliding of the inner cam 13 up to a predetermined position; an outer cam 16 accommodating the inner cam 13 inside in a manner rotatable at a predetermined rotation angle and slidable in the axial direction, the outer cam 16 being accommodated in the case cover 6 in a state being restrained from rotating and having a cam portion 17 on an end portion thereof in the same direction as the cam portion 15 of the inner cam 13; a guide plate provided on the partition wall side of said case cover to be engaged with said outer cam, with said first hinge shaft being inserted in an axial core portion thereof in the axial direction; an outer cam 16 accommodating the inner cam 13 inside in a manner rotatable at a predetermined rotation angle and slidable in the axial direction, the outer cam 16 being accommodated in the case cover 6 in a state being restrained from rotating and having a cam portion 17 on an end portion thereof in the same direction as the cam portion 15 of the inner cam 13; a guide plate 12 provided on the partition wall 6a side of the case cover 6 to be engaged with the outer cam 16, the said first hinge shaft 4 being inserted in an axial core portion thereof in the axial direction; a spring 14 resiliently provided between the inner cam 13 and the guide plate 12 in a state being wound on the first hinge shaft 4 to bias the inner cam 13 to rotate in one direction and to slide in one direction; a cam follower 18 in which the first hinge shaft 4 is inserted through an axial core portion thereof in the axial direction and a cam portion 20 is provided on a side corresponding to the inner cam 13 accommodated in the cover in a slidable manner in one direction; and a compression spring 19 which biases the cam follower 18 to slide in a direction of the inner cam 16 and the outer cam.

Figure 18:
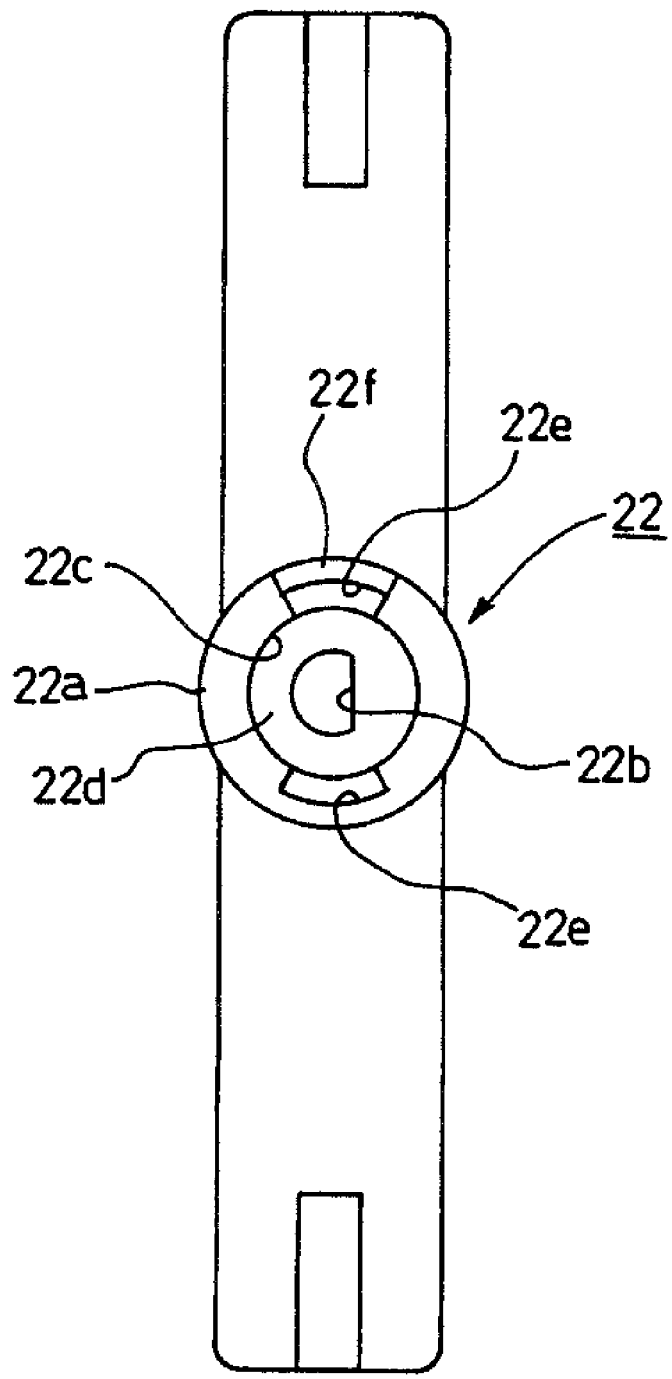
FIG. 18 is a rear view of a mounting member.

Next, on a substantially center portion of the second hinge shaft 9, a flange portion 9c is provided as shown in FIG. 6 to FIG. 8 and FIG. 17 to restrict movement of the second hinge shaft 9 in the axial direction. This second hinge shaft 9 is rotatably inserted through an insertion hole 21a formed in a base cam 21, which is accommodated and fixed in an accommodating portion 6h formed inside the case cover 6, to protrude outside the case cover 6, and an attaching portion 9d having a substantially D shape on its cross-section formed on the tip portion thereof is inserted into and engaged with a deformed mounting hole 22b formed in on a side wall 22d of a mounting cylinder portion 22a at the center portion of a mounting member 22 having a substantially T shape, as shown in FIG. 6, FIG. 7 and FIG. 18. The second hinge shaft 9 has a circumferential groove 9e on a free end portion protruding more than the deformed mounting hole 22b, and by attaching an E ring 23 on this circumferential groove 9e, the mounting member 22 does not disengage from the second hinge shaft 9 and is locked to rotate with the mounting member 22. Mounting pieces 22g, 22g penetrate the mounting cylinder portion 22a of the mounting member 22 so as to be installed therein; these mounting pieces 22g, 22g are thus fixedly attached to either one of tips of the second member 2. In this mounting cylinder portion 22a of the mounting member 22, an accommodating portion 22c is formed having an axial core common to that of the deformed mounting hole 22b as shown in FIG. 6 and FIG. 7, and a rotary cam 24 is attached inside the accommodating portion 22c to be restrained therein from rotating and to be rotatable with the mounting member 22, with the second hinge shaft 9 being inserted through an insertion hole 24a thereof.

Figure 19:
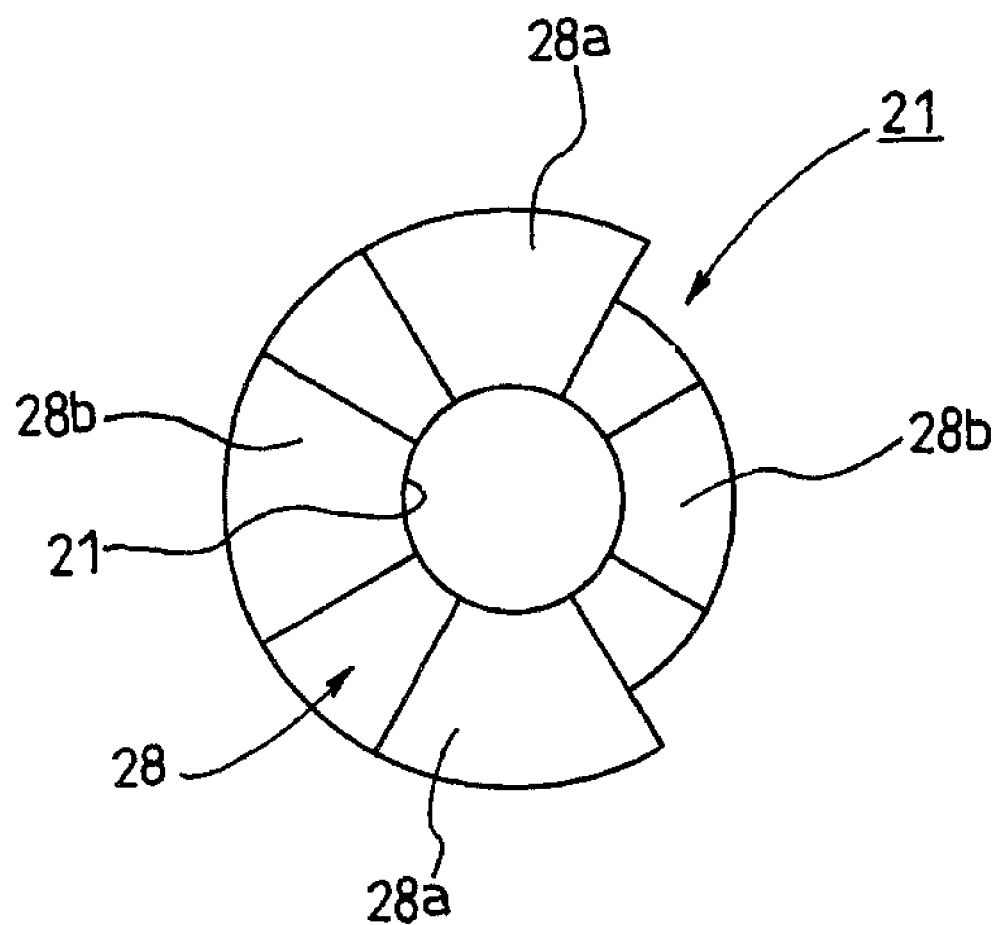
FIG. 19 is a plan view of a base cam.
Figure 20:
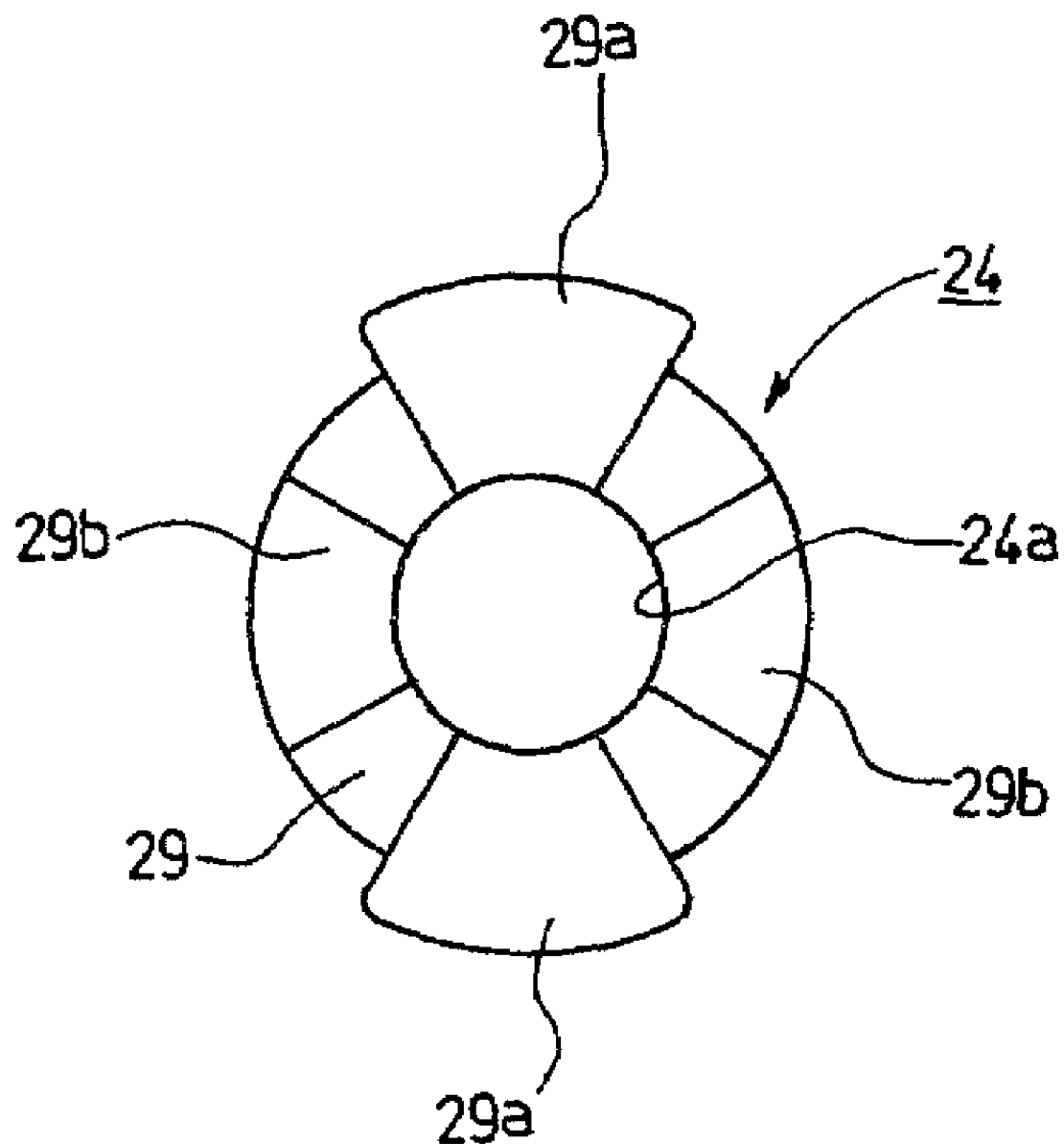
FIG. 20 is a rear view of a rotary cam.

Opposing faces of the base cam 21 and the rotary cam 24 are, as shown particularly in FIG. 19 and FIG. 20, a first cam portion 28 for swiveling and a second cam portion 29 for swiveling are formed respectively. These cam portion 28 for swiveling and a second cam portion 29 for swiveling are in pressure contact with each other by a compression spring 27 which is, particularly as shown in FIGS. 6 and 7, wound on the second hinge shaft 9, accommodated in the accommodating portion 22c, and resiliently disposed between a side wall 22d of the mounting member 22 and the rotary cam 24.

In a horizontal rotation control means 26, which controls a horizontal rotation of a first member 1 with regard to a second member 2, the following components are included: a first cam 28 for swiveling of a base cam 21, in which the second hinge shaft 9 is inserted through a center portion thereof in the axial direction in a rotatable manner, provided on the case cover 6 side; a second cam 29 for swiveling of a rotary cam 24, in which the second hinge shaft 9 is inserted through a center portion thereof in the axial direction in a slidable manner, attached on the second member 2; and a compression spring 27 wound on the second hinge shaft 9 to push the second cam 29 for swiveling toward the first cam 28 for swiveling.

Figure 21:
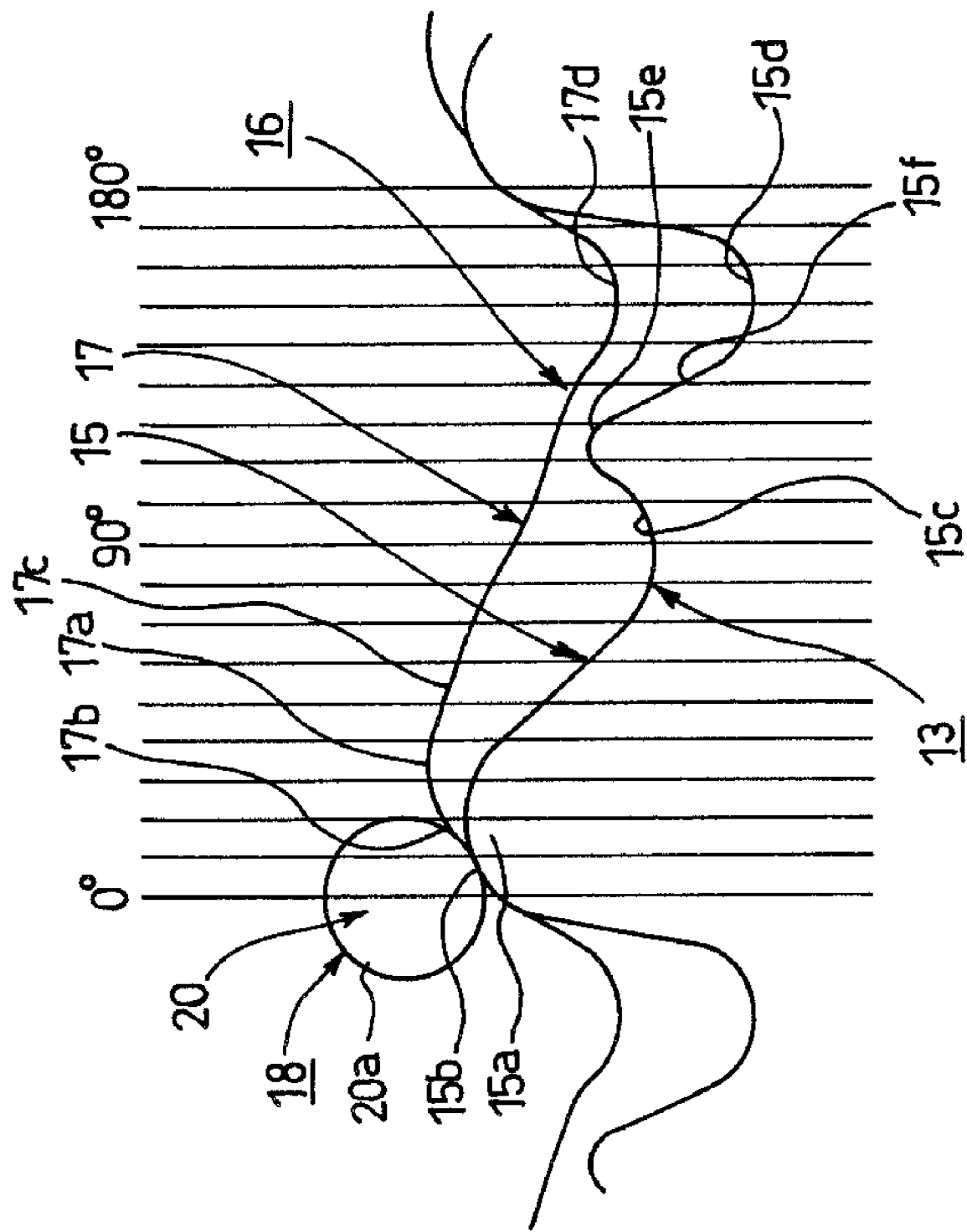
FIG. 21 is an explanatory view for explaining operations of a first cam portion, second cam portion, and third cam portion.
Figure 26:
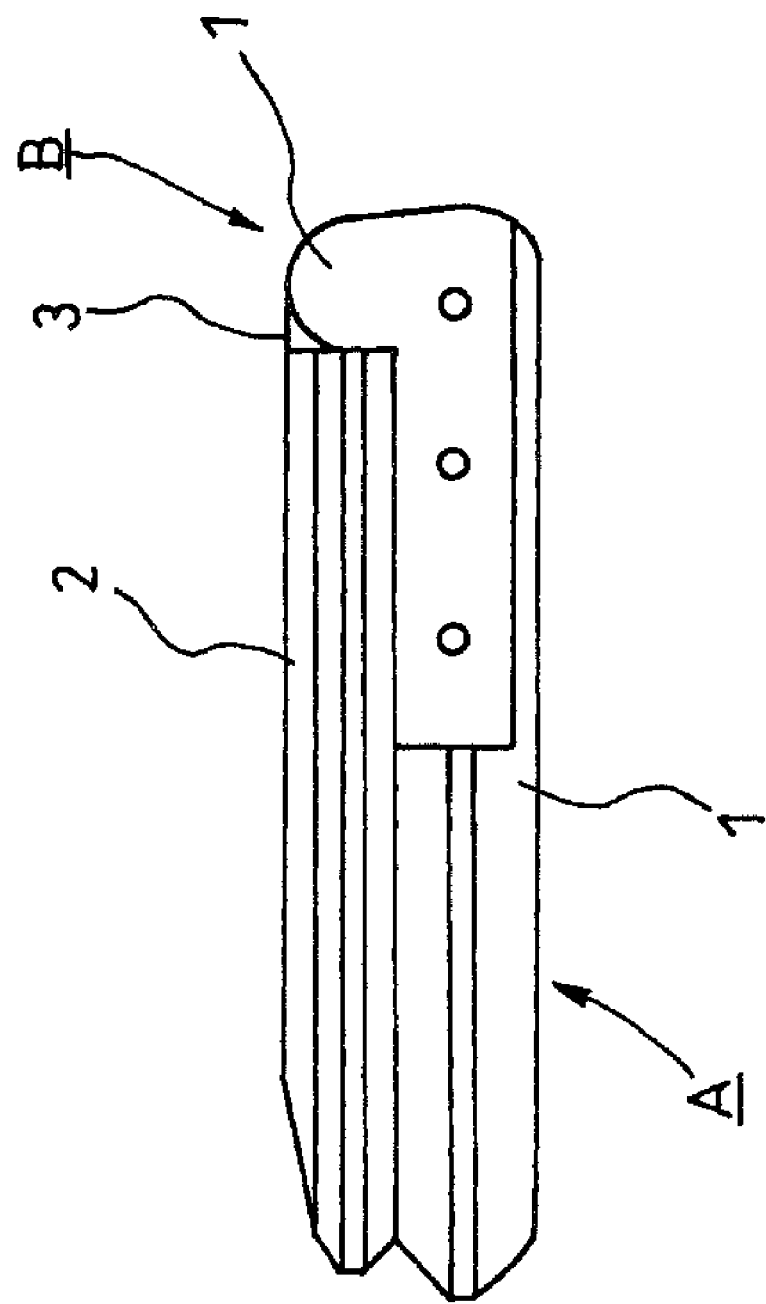
FIG. 26 is a side view showing the cellular phone using the hinge for portable terminal according to the present invention in a state that the receiver section is folded with respect to the transmitter section.

Next, operation of the hinge B in accordance with the above structure will be described. As shown in FIG. 26, in a state that the receiver section 2 is closed with respect to the transmitter section 1 of the cellular phone A, a projecting portion 20a of the third cam portion 20 of the cam follower 18 is positioned at respective first inclined surfaces 15b, 17b of a first projecting portion 15a of the first cam portion 15 and a projecting portion 17a of the second cam portion 17 of the inner cam 13 and the outer cam 16 as shown in FIG. 21, so that the projecting portion 20a receives a force in a direction to close the receiver section 2 toward the transmitter section 1 due to the resilient force of the compression spring 19 as shown in FIG. 5, and thus it is in a locked state.

At this time, tips of the locking projections 13c, 13c of this inner cam 13 are positioned at first key grooves 16c, 16c (refer to FIG. 13) at tip portions of the locking grooves 16b, 16b of the outer cam 16, and in a state pulled inside the outer cam 16 against the resilient force of the coil spring 14. Furthermore, this inner cam 13 intends to rotate to the left side in the drawing (FIG. 21) by the rotation torque of the coil spring 14, but this rotation is blocked by the projecting portion 20a of the third cam portion 20 of the cam follower 18.

Figure 22:
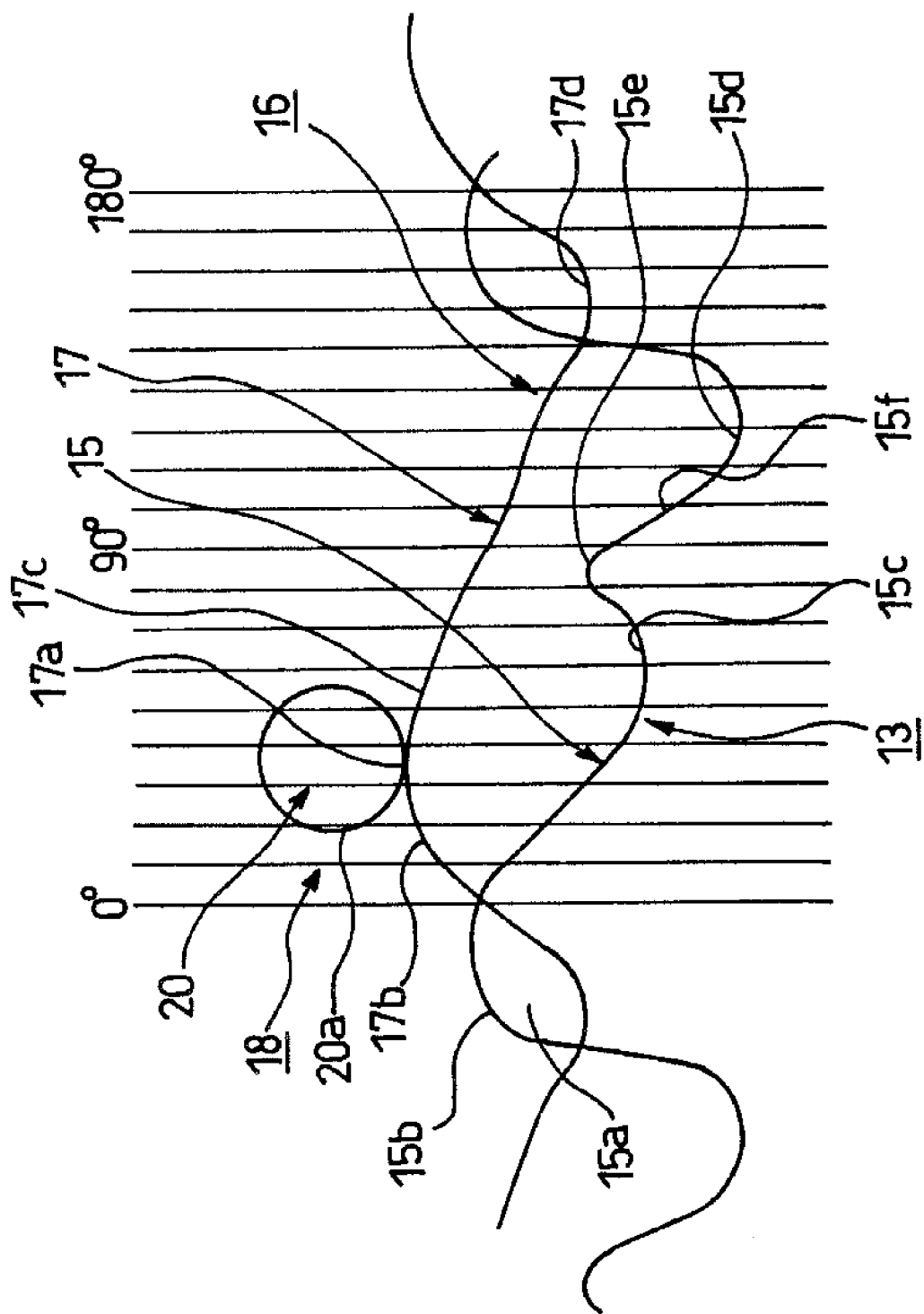
FIG. 22 is an explanatory view for explaining operations of the first cam portion, second cam portion, and third cam portion.
Figure 23:
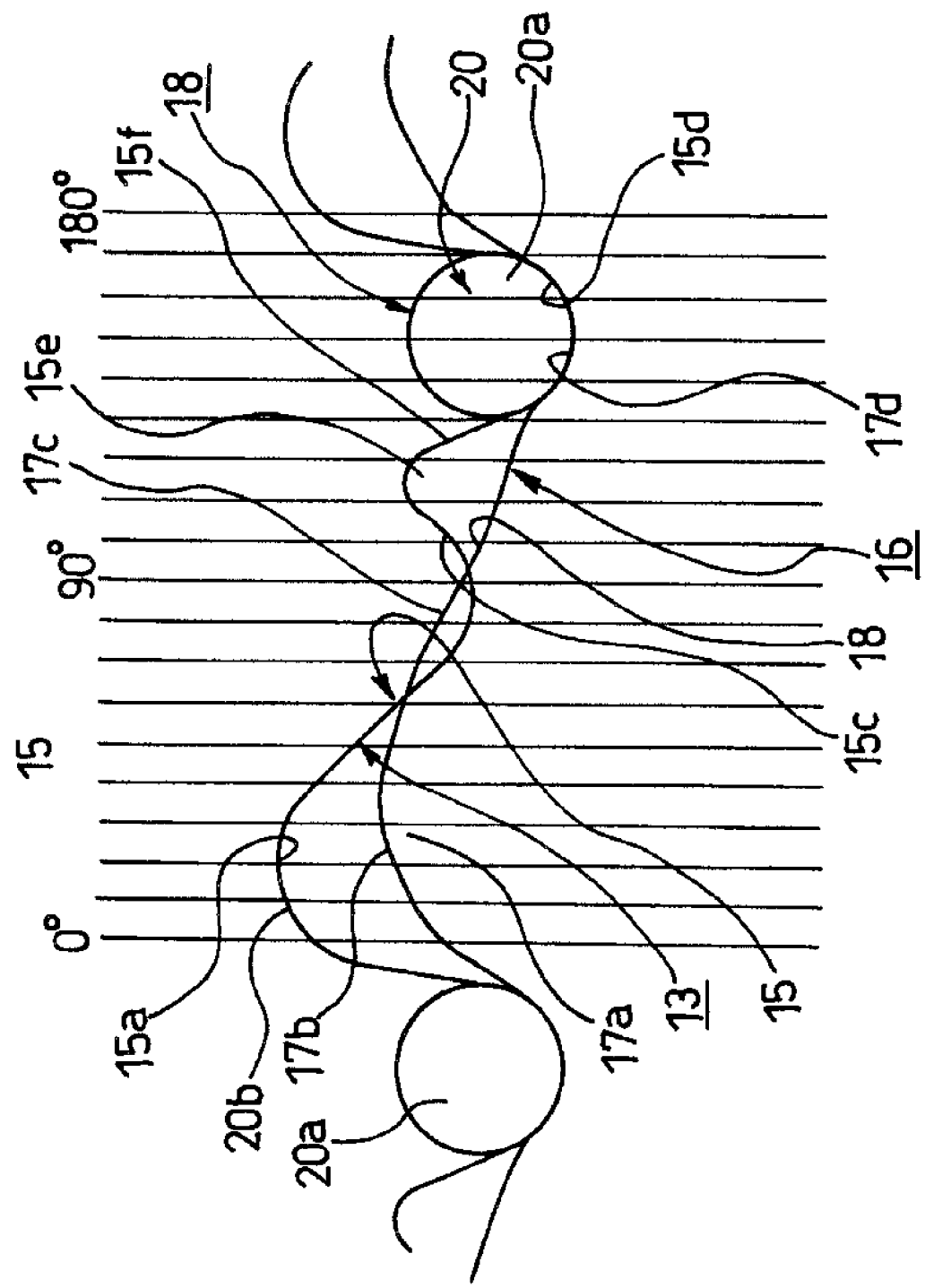
FIG. 23 is an explanatory view for explaining operations of the first cam portion, second cam portion, and third cam portion.

From this position, when the receiver section 2 is opened with respect to the transmitter section 1, the projecting portion 17a of the second cam portion 17 of the outer cam 16 passes over the projecting portion 20a of the third cam portion 20 of the cam follower 18; therefore the outer cam 16, on which a rotation torque is generated via the coil spring 14 and the inner cam 13, and reaches the second inclined surface 17c as shown in FIG. 22, so that the receiver section 2 slides above the second inclined surface 17c and opens automatically up to 150° as shown in FIG. 23. On the other hand, the inner cam 13 rotates in the leftward direction by the restoring force (rotation torque) of the coil spring 14 and stops at a position shown in FIG. 22.

Figure 27:
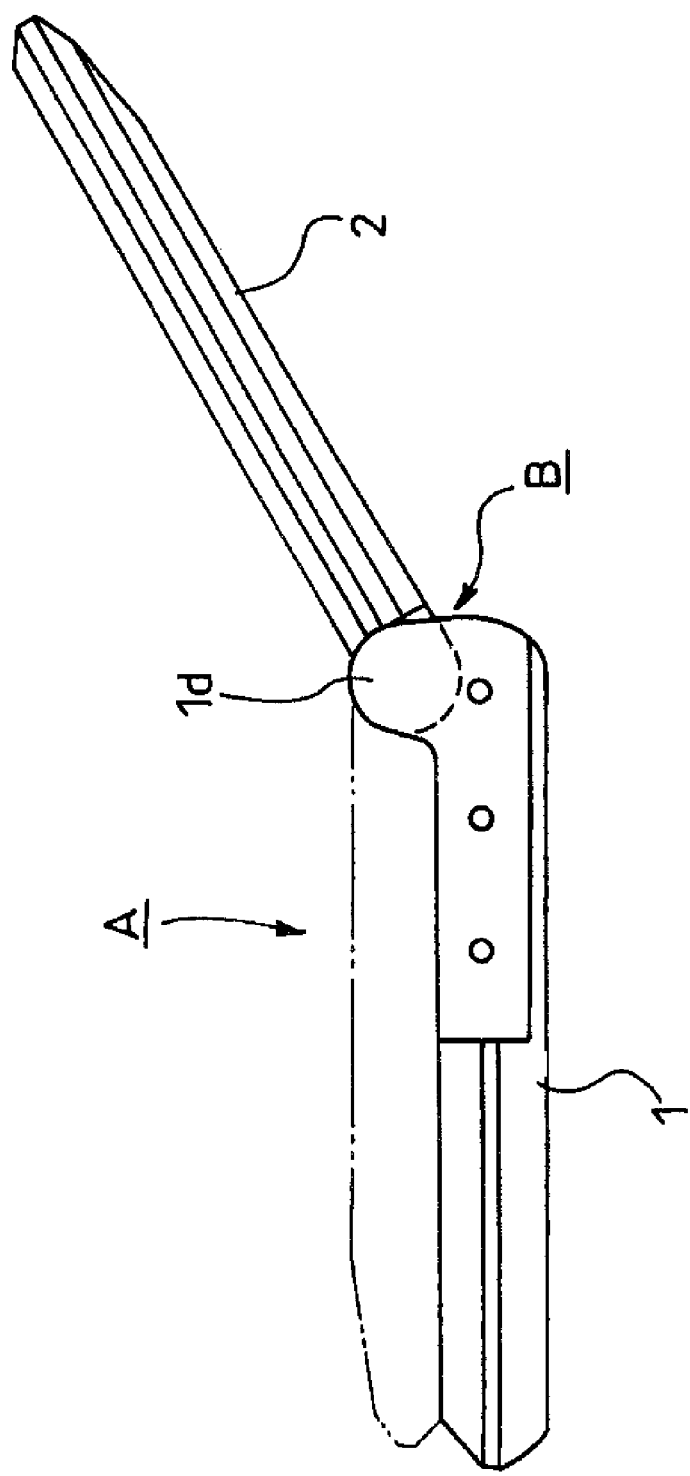
FIG. 27 is a side view showing the receiver section opened at 150° with respect to the transmitter section.

When opened up to 150°, the projecting portion 20a of the third cam portion 20 of the cam follower 18 stops by dropping into a recessed portion 17d of the second cam portion 17 of the outer cam 16 as shown in FIG. 23. FIG. 27 shows a state that the first member 1 and the second member 2 are in this position. At this time, the first projecting portion 15a of the first cam 15 overlapping with the recessed portion 17d of the second cam 17 is pushed by the projecting portion 20a of the cam follower 18, so that the inner cam 13 rotates in a rightward direction against the rotation torque of the coil spring 14, and the tips of the locking projections 13c, 13c are at the position of the second key grooves 16d, 16d of the tip portions of the locking grooves 16b, 16b of the outer cam 16 (refer to FIG. 13) and move in a direction to project more than the outer cam, thereby taking a state shown in FIG. 23.

Figure 24:
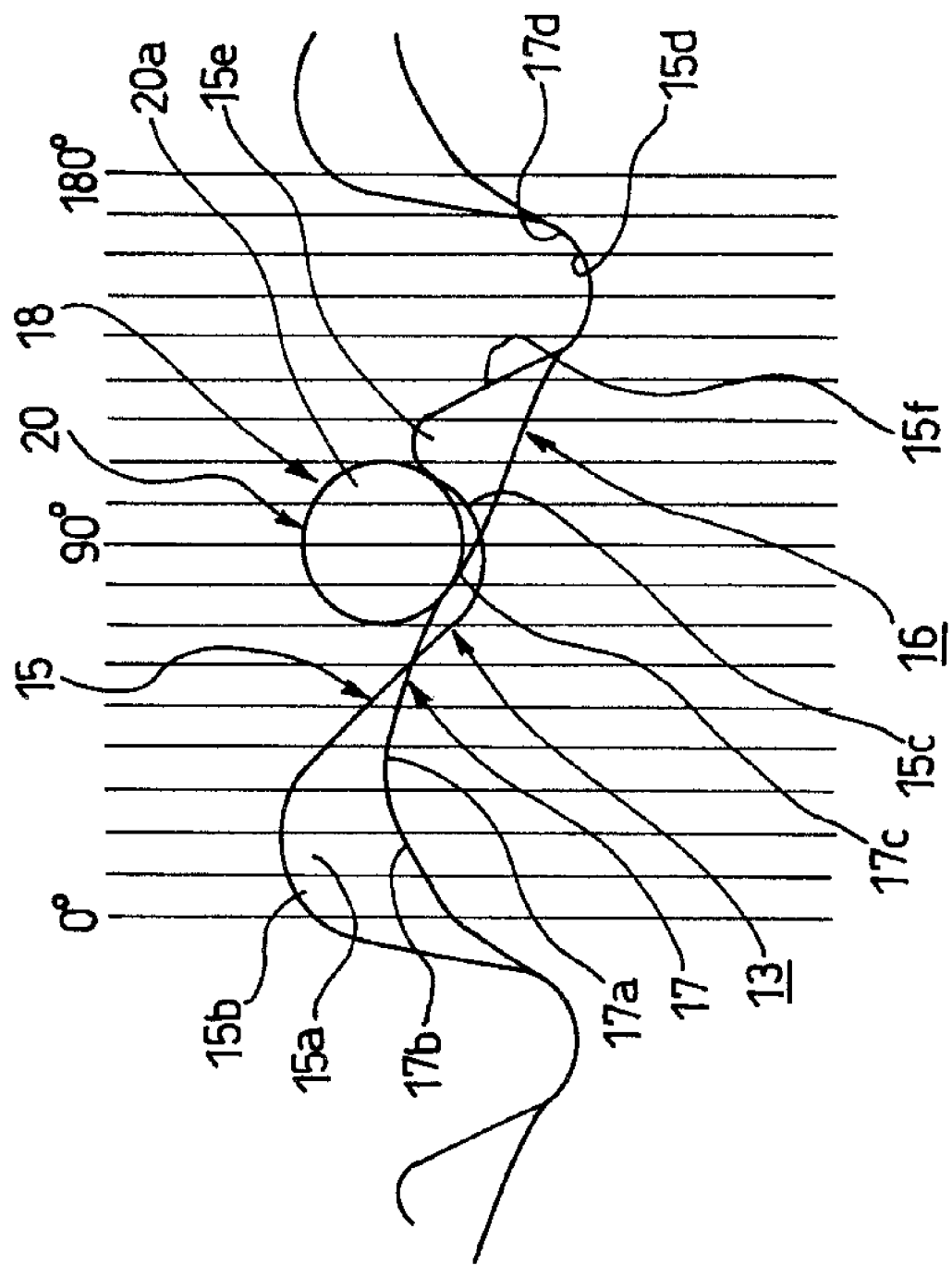
FIG. 24 is an explanatory view for explaining operations of the first cam portion, second cam portion, and third cam portion.
Figure 28:
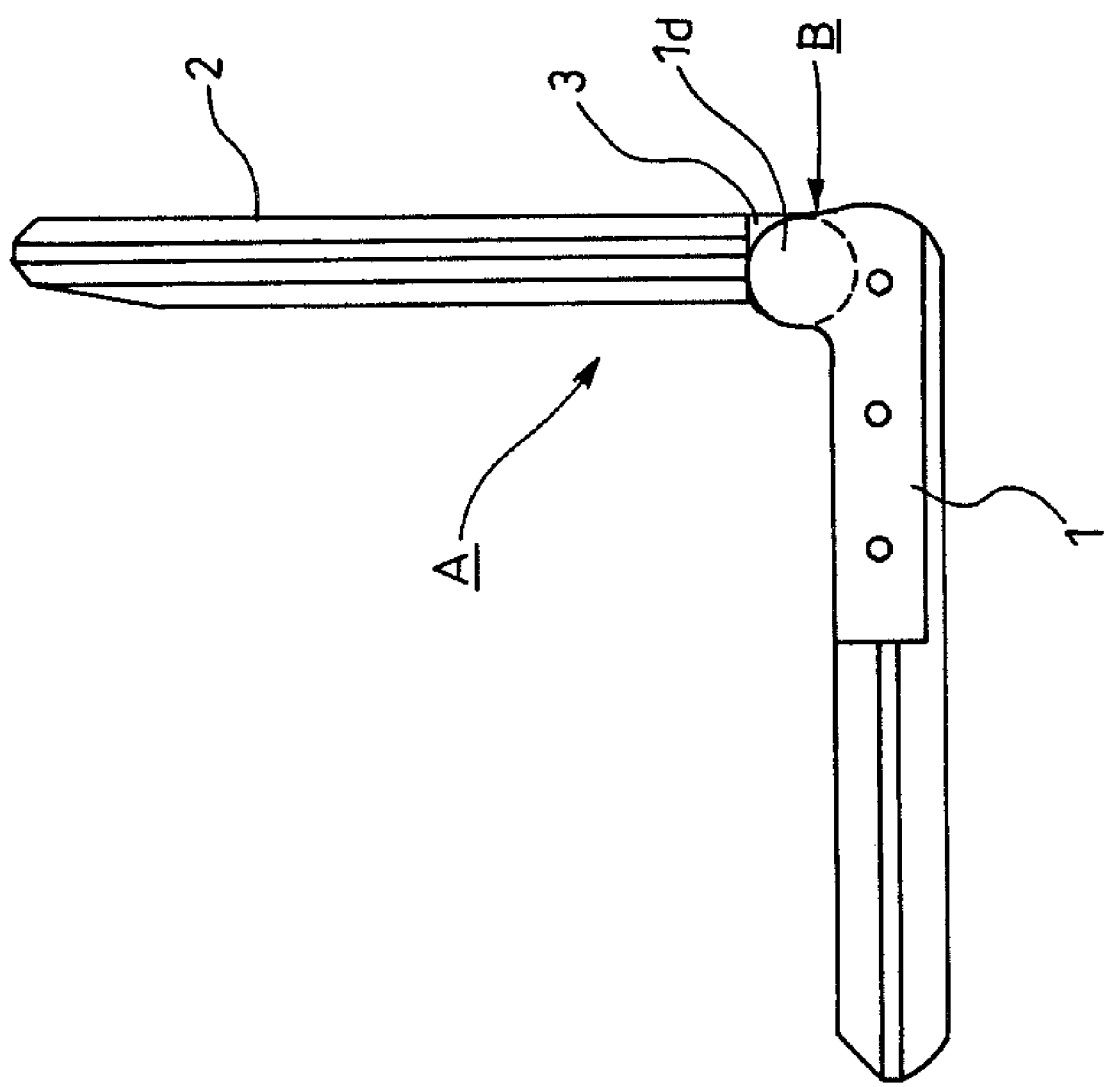
FIG. 28 is a side view showing the receiver section closed up to 90° from the state shown in FIG. 27 with respect to the transmitter section.

Then, from this 150° open state, when the second member 2 is closed toward the first member 1 side, the inner cam 13, forced by the projecting portion 20a of the cam follower 18 at a position of 90°, rotates to the right; further, since the locking projections 13c, 13c are located at second key grooves 16d, 16d with a rotation thereof being restricted, they climb a second inclined portion 15f of the inner cam 13, pass over the second projecting portion 15e, drop into a first recessed portion 15c side and are click-stopped therein. This state is shown in FIG. 24 and FIG. 28.

Figure 10:
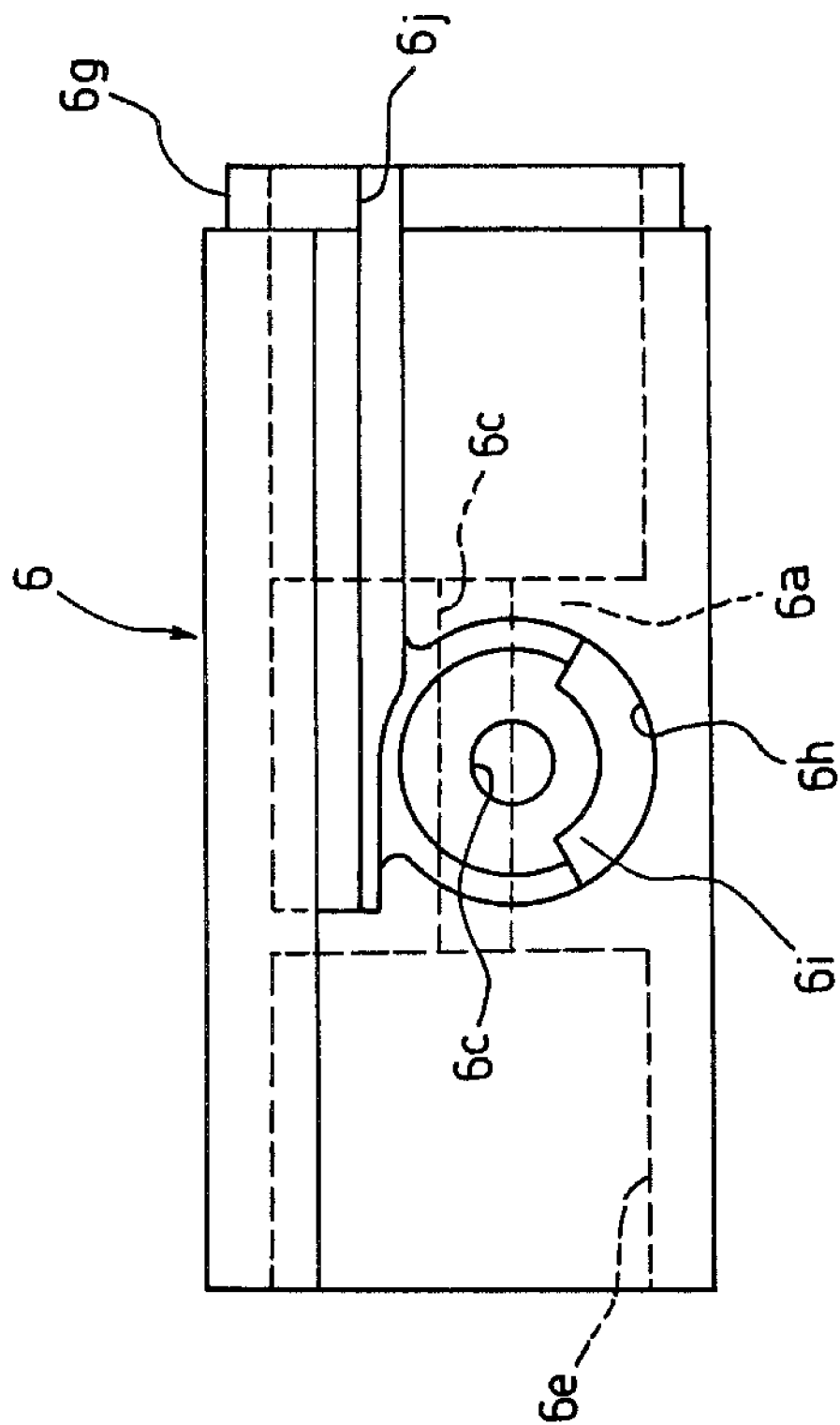
FIG. 10 is a front view of the case cover.
Figure 29:
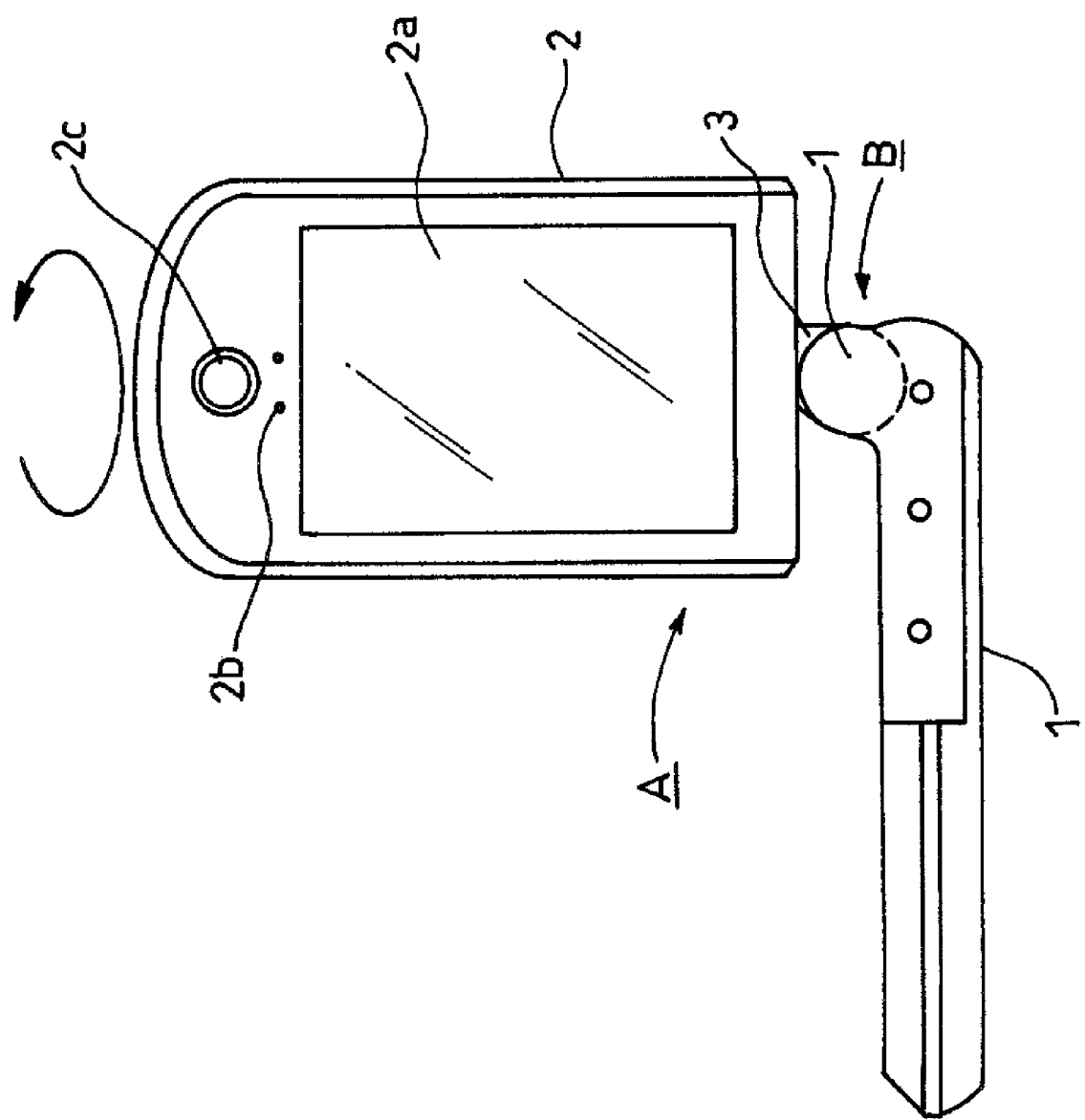
FIG. 29 is a side view showing the receiver section rotated at 90° in a horizontal direction from the state in FIG. 28.

In this state, as shown in FIG. 7, the first escape recessed portion 4c formed on the first hinge shaft 4 corresponds to the second escape recessed portion 9b formed on the second hinge shaft 9, allowing rotation of the second hinge shaft 9, so that the second member 2 can rotate leftward and rightward in a horizontal direction with respect to the first member 1 as shown in FIG. 29. This rotation angle is restricted as shown in FIG. 8 and FIG. 18 by a stopper portion 22e of the mounting member 22 coming into contact with a stopper wall 6i formed in the second accommodating portion 6h formed inside the case cover 6 as shown in FIG. 10, and is 180° in both the rightward and leftward rotational directions in this embodiment 1.

The second member 2 is in a locked state at the 0° position since it is biased to rotate in the closing direction by the resilient force of the compression spring 27 and by respective cam portions 28, 29 of the first cam portion 28 for swiveling and the second cam portion 29 for swiveling with respective projecting portions 28a, 29a and recessed portions 28b, 29b being in an engaged state. The second member 2 is devised to stop freely at an intermediate rotation angle by operation of a friction torque due to the respective projecting portions 28a, 29a being in a pressure contact state, and to keep a 180° position by being biased again at the 180° position to rotate so that the respective projecting portions 28a, 29a engage with the recessed portions 28b, 29b.

Figure 25:
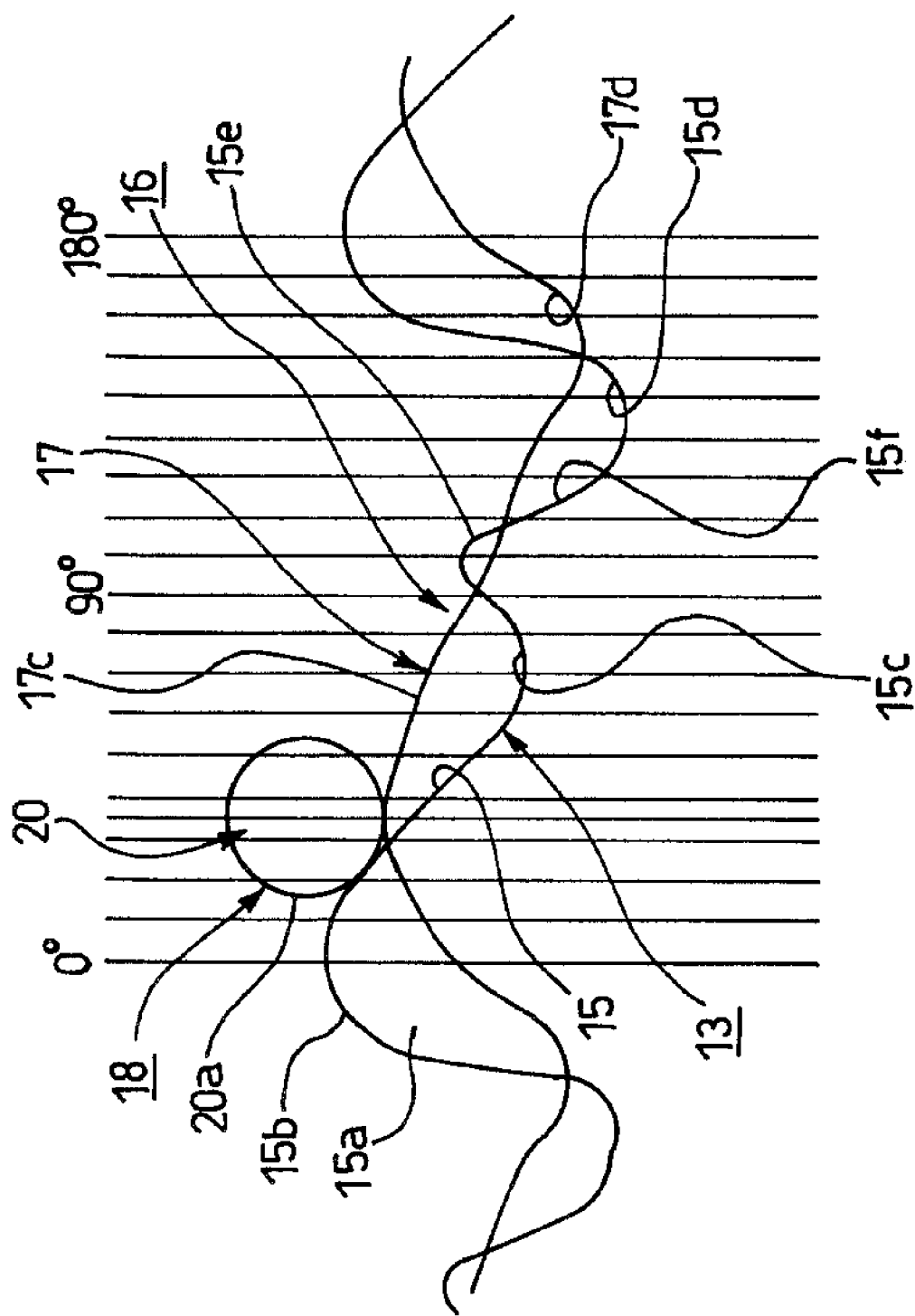
FIG. 25 is an explanatory view for explaining operations of the first cam portion, second cam portion, and third cam portion.

When the second member 2, once closed up to 90° from a fully opened state (at 150°) with respect to the first member 1, is pushed further in the closing direction, the projecting portion 20a of the third cam portion 20 of the cam follower 18 ascends the second inclined surface 17c of the second cam portion 17 of the outer cam 15 to be closed, thereby taking a state shown in FIG. 25. When the second member 2 is further closed from this state, it takes a state shown in FIG. 21 to be locked at the close position of 0°.

Just before the second member 2 is opened 150° with respect to the first member 1, the projecting portion 20a of the third cam portion 20 of the cam follower 18 drops into the recessed portion 17d of the second cam portion 17 of the outer cam 16 to be locked at the open position.

What is claimed is:

1. A hinge for a two-fold type, portable terminal coupling a first member having a keyboard portion and a second member having a display portion to each other in a manner capable of opening/closing the first and second members in a vertical direction and capable of rotating the first and second members in a horizontal direction at a predetermined open angle, comprising:
    a cylindrical case cover having a partition wall in a center portion thereof;
    a first hinge shaft which passes through the partition wall of said case cover and extends in an axial core direction of said case cover so as to be restricted from moving in a first axial direction and so as to allow said case cover to rotate around an axis thereof, and which has a first escape recessed portion provided in a portion thereof passing through the partition wall;
    a case in which said first hinge shaft passes through in an axial core portion thereof in the first axial direction and which is fixed to a first free end side of said first hinge shaft;
    a vertical rotation control means, which is provided between said case and said case cover and constituted of a first cam mechanism, for controlling vertical rotation of said case cover;
    a second hinge shaft having a second escape recessed portion and rotatably attached to the partition wall, with the second escape recessed portion being in contact with and crossing the first escape recessed portion of said first hinge shaft;
    a mounting member which has a mounting cylindrical portion and a mounting piece attached to the second member and is provided on a second free end side of said second hinge shaft to be rotatable at a predetermined horizontal rotation angle, said second hinge shaft passing through the mounting cylindrical portion in a second axial direction, said mounting member being restricted from disengaging so as to rotate together with said second hinge pin, and one end side of said mounting member abutting on said case cover; and
    a horizontal rotation control means, which is provided between said mounting member and said case cover and constituted of a second cam mechanism, for controlling horizontal rotation of said case cover,
    wherein one end of said case cover is rotatably supported by one of attaching portions provided on both sides of an end portion of the first member, said case is inserted and fitted in a mounting portion provided in the other attaching portion of the first member, said mounting member is fixed to the second member, and said first hinge shaft and said second hinge shaft have the escape recessed portions in a portion where the said first hinge shaft and said second hinge shaft are in contact with each other and cross each other, so that from a closing state to a predetermined open angle of the first member and the second member, said first hinge shaft engages with the second escape recessed portion of said second hinge shaft to restrain the rotation of said second hinge shaft, and at the predetermine open angle, the second escape recessed portion of said second hinge shaft is at a position facing the first escape recessed portion of said first hinge shaft to allow the second hinge shaft to rotate.

2. The hinge for a portable terminal according to claim 1, wherein said vertical rotation control means comprises:
    an inner cam having a cam portion on an end portion thereof and arranged in said case cover with said first hinge shaft being inserted through a center portion thereof in the axial direction in a slidable and rotatable manner;
    a flange portion provided in said first hinge shaft to limit the axial direction sliding of the inner cam up to a predetermined position;
    an outer cam accommodating said inner cam inside in a manner rotatable at a predetermined rotation angle and slidable in the axial direction, said outer cam being accommodated in said case cover in a state being restrained from rotating and having a cam portion on an end portion thereof in the same direction as the cam portion of said inner cam;

a guide plate provided on the partition wall side of said case cover to be engaged with said outer cam, with said first hinge shaft being inserted in an axial core portion thereof in the axial direction;

a spring resiliently provided between said inner cam and said guide plate in a state being wound on said first hinge shaft to bias said inner cam to rotate in one direction and to slide in one axial direction;

a cam follower in which said first hinge shaft is inserted through an axial core portion thereof in the axial direction and a cam portion is provided on a side corresponding to said inner cam accommodated in said cover in a slidable manner in one direction; and a compression spring which biases said cam follower to slide in a direction of said inner cam and said outer cam.

3. The hinge for a portable terminal according to claim 1, wherein said horizontal rotation control means comprises:

a first cam for swiveling of a base cam, in which said second hinge shaft is inserted through a center portion thereof in the axial direction in a rotatable manner, provided on said case cover side;

a second cam for swiveling of a rotary cam, in which said second hinge shaft is inserted through a center portion thereof in the axial direction in a slidable manner, attached on the second member; and a compression spring wound on said second hinge shaft to push the second cam for swiveling toward said first cam for swiveling.

4. The hinge for a portable terminal according to claim 1, wherein said case cover has a conducting wire guiding portion formed therein in which a conducting wire connecting the first member and the second member is passed through.

* * * * *